United States Patent
Kannan et al.

(10) Patent No.: US 6,298,352 B1
(45) Date of Patent: Oct. 2, 2001

(54) APPARATUS AND METHOD FOR MANAGING NUMBER SOURCES

(75) Inventors: Sivaramakrishna Kannan, Chantilly, VA (US); Dan M. Parkins, Silver Spring, MD (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/121,393

(22) Filed: Jul. 23, 1998

(51) Int. Cl.[7] ........................................ G06F 17/30
(52) U.S. Cl. ........................ 707/102; 707/104; 379/201
(58) Field of Search ................................ 707/102, 104; 379/201

(56) References Cited

U.S. PATENT DOCUMENTS

| | | | |
|---|---|---|---|
| 5,168,444 | * 12/1992 | Cukor et al. | 705/1 |
| 5,732,131 | * 3/1998 | Nimmagadda et al. | 379/211 |
| 5,826,239 | * 10/1998 | Du et al. | 705/8 |
| 5,862,322 | * 1/1999 | Anglin et al. | 395/185.1 |
| 5,933,489 | * 8/1999 | Sensabaugh et al. | 379/219 |

* cited by examiner

Primary Examiner—Wayne Amsbury

(57) ABSTRACT

A number resource management system for automatically managing number resources implements a Web-based client-server application for accessing and updating information pertaining to a number resource in a stored repository of number resources. Each number resource has an associated unique customer identifier and an associated status attribute. A Web/browser-based interface device enables communication between a business client and an accessing server, the interface device directing the server to retrieve and update information relating to a number resource according to a unique customer identifier and/or a status attribute input.

35 Claims, 13 Drawing Sheets

APPARATUS AND METHOD FOR MANAGING NUMBER SOURCES

FIELD OF THE INVENTION

The present invention relates generally to methods employed in managing resources, and more particularly, to an apparatus and method for managing number resources of a telecommunications service provider.

BACKGROUND OF THE INVENTION

In the telecommunications service industry, numbers, e.g., telephone numbers, are a valuable and finite resource. Number resource management, i.e., the process of setting aside specific numbers for external and internal customers, has become a critical function of telecommunications service providers.

Recent changes in the U.S. telecommunications regulatory environment have opened up local markets to competition and, in response, Local exchange carriers and providers of telecommunications services have instituted Local Number Portability ("LNP") plans which enable customers to keep their local ten digit telephone number (i.e., NPA-NXX) when they move from one carrier to another. However, as a result of increasing competition and LNP in the local markets, management of local telephone numbers has become more complex. With the growth in local services, carriers, and customers, telephone numbers have become a limited resource and are no longer the exclusive property of one company in any geographical region. Several new carriers in each local serving area must now be assigned various numbers, and a number can move with a customer from one carrier to another.

Besides providing portability among carriers, there is fast approaching the need for LNP plans to provide geographical number portability which enable customers to take their local telephone number with them when they move from one serving area or rate center to another. This means that associating a number with a rate center becomes a dynamic function. Complicating this matter is the fact that federal regulations dictate how numbers must be reserved, assigned, and managed, with many states imposing their own regulations. A carrier must abide by both federal and state regulations in each local serving area in which they compete.

To date, the process of managing and tracking numbers, e.g., available to a local service customer base is predominantly manual, increasing potential for error and loss of data integrity. A common cause of rejects during the telecommunications service provisioning process is directly related to the use of numbers that are already in service or do not belong to the telecommunications service provider. Lack of specific business rules regarding number reservation and assignment have caused an inefficient use of the numbers and have negatively impacted sales and revenue.

It would thus be highly desirable to provide an integrated means for managing number resources, including the reservation, assignment, and status tracking of local telephone numbers.

It would additionally be highly desirable to provide a highly automated process enabling local sales personnel and order entry staff of a telecommunications service provider immediate access to available number resources for expedient processing of customer orders.

Furthermore, it would thus be highly desirable to provide a telecommunications number management system with a comprehensive automated LNP plan that can provide number portability among carriers and geographical portability.

SUMMARY OF THE INVENTION

The instant invention is directed to a Number Resource Management ("NRM") system that provides an integrated means for the reservation, assignment, status tracking, and overall management of local telephone numbers, and particularly, facilitates management of number resources that have been ported to/from local service providers (carriers).

The number resource management system includes: a database for storing a repository of number resources each associated with a unique customer identifier and having an associated status attribute; a server for accessing information relating to the number resources; a web/browser-based interface device for enabling communication between a business entity and the accessing server, the interface device directing the server to retrieve information relating to number resources according to a specified customer identifier and/or a status attribute for display via the interface device.

In the preferred embodiment, the Number resource Management system provides an integrated means for the reservation, assignment, status tracking, and overall management of local telephone numbers including those numbers that are assigned to a carrier by a Public Utility Commission (PUC) or other regulatory body, and those numbers that port into a carrier when a customer leaves one carrier and signs up for local service with another carrier. Essential to the invention is the NRM database management system that provides automation of numerous number reservation, assignment, and tracking functions. In addition, it provides automated interfaces with other systems to provide an overall local number management system that is tied in with the local service order entry and provisioning process.

Advantageously, the NRM system has wide applicability to the management of any limited resource that requires reservation and assignment including, but not limited to, toll-free (800, 888, etc.) telephone numbers, cellular, and PCS telephone numbers, credit card numbers, Internet addresses, license plates, etc.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE PREFERRED EMBODIMENT

Figure 1:
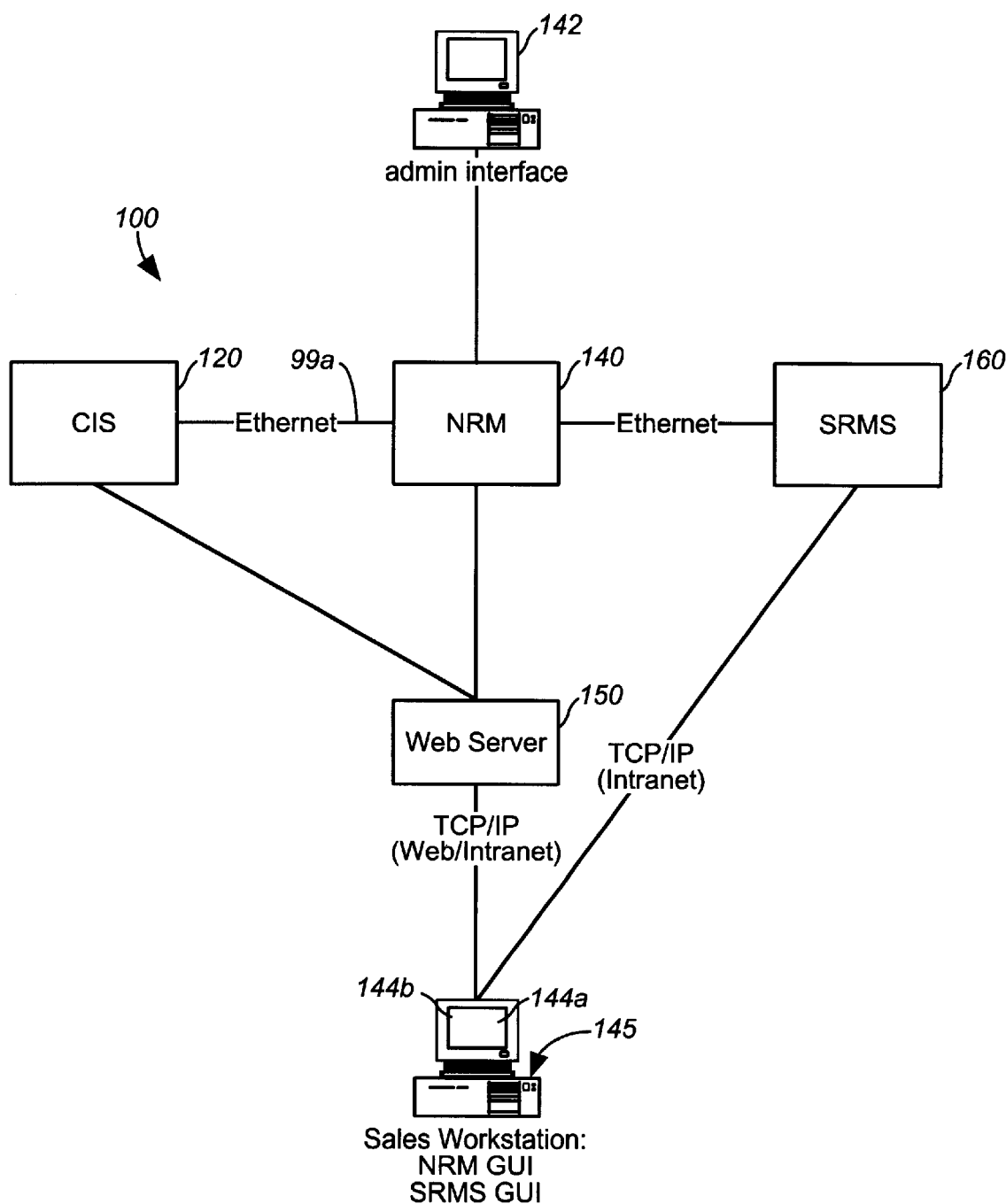
FIG. 1 illustrates NRM as a component in an overall systems architecture for the number resource management system of the invention.

FIG. 1 illustrates the Number Resource Management ("NRM") system 100 of the invention having several components integrated to accomplish the reservation, assignment, status tracking, and overall management of local telephone numbers for a telecommunications service provider. The NRM system 100 components include: a Customer Information System 120 ("CIS") which is a database management system that stores customer information such as account numbers, customer names, billing addresses, service addresses, etc., for local services; a Number resource Management ("NRM") system 140 responsible for supporting the telephone number ("TN") reservation, tracking and TN management processes; and, a Service Resource Management System ("SRMS") 160 which is a service order entry and provisioning system used to enter and provision orders for local services for customers, and can automatically assign telephone numbers to a customer, i.e., activate a number for a specific service.

More particularly, the NRM system component 140 comprises a general purpose computer; however, in the preferred embodiment, comprises a mid-range server (e.g., DEC Alpha or IBM RS/6000) or server cluster implementing software components including a database and database server and various other processes as will be described. It has a direct service administration interface 142 (e.g., keyboard, mouse, monitor) to enable system administration functions, database management, and business rules overrides. It is through this component, for instance, that telephone numbers assigned to a carrier by a Public Utilities Commission (PUC) are entered into the NRM database 140.

Preferably, as shown in FIG. 1, a NRM graphical user interface ("NRM GUI") component 144a is provided to enable entry of new numbers that port into the carrier when a customer leaves another carrier, and to reserve and assign locally owned numbers, i.e., in one rate center, for a customer. Preferably, the NRM GUI 144a is a Web-based application that can be run on any standard PC 145 with a Web browser, e.g., Netscape Navigator® 4.01. Accordingly, the NRM server can be linked to a Web Server 150 supporting a Web site that users can access over a TCP/IP network interface. The TCP/IP network can be a private network, such as an Intranet, or a public network, such as the Internet provided security firewalls are put in place. It should be understood, however, that the NRM GUI 144a application can be embedded in a sales agent's PC with a direct link (e.g., dedicated network, dial-up line, etc.) to the NRM Server 140. In the preferred embodiment, the CIS component 120 is also served by the Web Server 150.

The interaction of the NRM system components will now be described as follows:

As shown in FIG. 1, the NRM Server interface to CIS 120 is a messaging interface implemented over an Ethernet LAN 99a. In the preferred embodiment, the interface uses a proprietary messaging product known as "Registry" such as described in co-pending U.S. patent application Ser. No. 08/560,550, assigned to the assignee of the instant invention the contents and disclosure of which is incorporated by reference as if fully set forth herein. A particular function of the CIS 120 is to store a customer/location identifier that preferably is eight (8) digits long and that is assigned to each customer location to uniquely identify a local service and telephone number. The eight-digit customer identifier comprises a four-digit customer number plus a four-digit location number and is used throughout the system architecture to uniquely identify each customer location. Via the NRM GUI 144a, a sales agent can enter a customer name and location (city, state), and the NRM GUI 144a queries the NRM 140 database to retrieve the customer identifier. If multiple identifiers exist for the entered customer name and location, the NRM GUI 144a displays all of them and allows the sales agent to select one. The sales agent then uses this identifier for all functions, such as reserving numbers for that customer or creating a sales order. If the sales agent knows the customer identifier for a customer location, the agent can enter it into the NRM GUI, and NRM 140 confirms that this customer identifier exists by issuing a query to CIS. If a new customer location is needed, the NRM GUI 144a allows the sales agent to select the four-digit customer number and enter a new four-digit location number, thus creating a new customer identifier.

Figure 6:
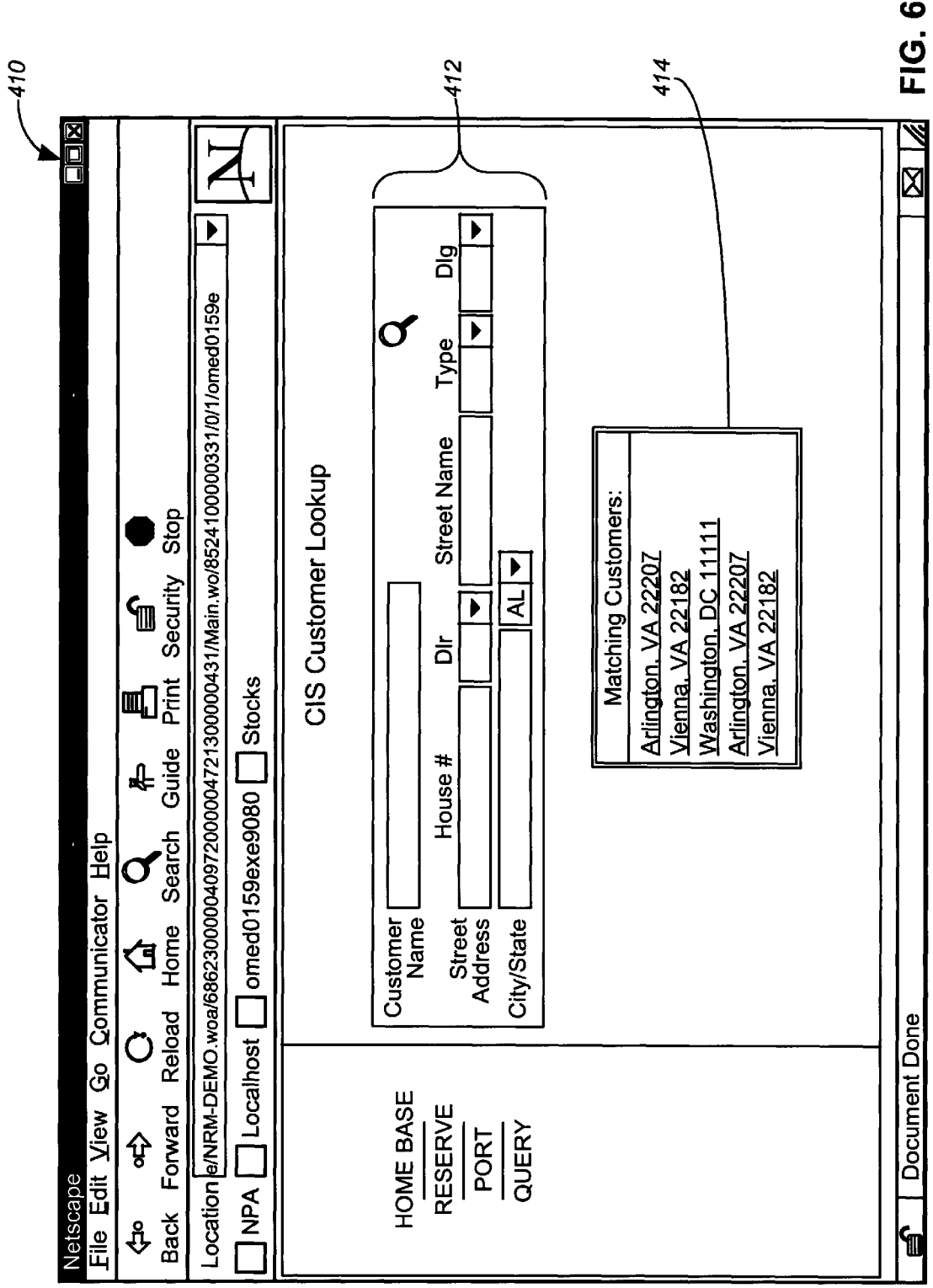
FIG. 6 illustrates an exemplary dialog screen presented to the user for performing a CIS customer look-up.

It should be understood that the NRM GUI 144a can be embodied by HTML files and/or Java applications downloaded from the Web Server 150 over a TCP/IP network. Thus, a sales agent can access the Web Server 150 using their Web browser and after logging in, can issue transactions to either the NRM Server or the CIS and, can directly retrieve a customer identifier from CIS 120 by issuing a query comprising a customer name and location to CIS. FIG. 6 illustrates an exemplary dialog screen 410 presented to the user indicating the entry fields 412 required to perform a CIS customer look-up. After such entry, the agent is presented with a list 414 of matching names that NRM retrieves from CIS 120. From this list, the sales agent can select the correct customer. Otherwise, the sales agent can enter a new customer name and location, via a similar interface, for assignment of a new customer/location identifier within CIS.

The SRMS 160 additionally has a messaging interface with NRM 140 implemented over an Ethernet LAN. Through this interface, SRMS obtains the telephone numbers that have been assigned to a customer, and provisions the customer's order with these numbers. The SRMS also has its own GUI 144b, which may or may not Web-based, but does utilize a TCP/IP link to the SRMS Server. In the preferred embodiment, the NRM GUI 144a and the SRMS GUI 144b run on the same PC, e.g., a Sales Workstation 145, as shown in FIG. 1. Thus, in this embodiment, a sales agent can use a single workstation to reserve and assign numbers to a customer in NRM, and then create a sales order for that customer in SRMS. The messaging interface between the SRMS 160 and NRM 140 enables auto-population of sales orders with NRM data. Particularly, when a number has been reserved for a customer, a service order including the eight-digit customer/location identifier for that customer can be entered into SRMS 160. Then SRMS uses the customer/location identifier to retrieve the reserved numbers from NRM 140. These numbers are uploaded to the SRMS GUI 144b, and the order screen is auto-populated with these numbers, thus, eliminating the need for manual order entry of the numbers, and the associated possibility for error. The sales agent can select all or some of the reserved numbers to assign to the service order. Not all numbers reserved for a customer need to be assigned to an order. A customer may reserve 30 numbers, for example, but only request the activation of 20 of them. The sales agent selects which reserved numbers to assign. The SRMS adds the selected numbers to the service order, and updates their status in NRM from "reserved" to "assigned".

As will be explained, the NRM 140 tracks the status of each number in accordance with business definitions. In the preferred embodiment, the following number statuses are tracked by the NRM system: 1) "Open"—which status indicates that the TN is available for reservation/assignment. For example, when a new (not ported) TN number is first entered into NRM, or, after a disconnected number has been aged for a certain time, it is assigned a status of "OPEN"; 2) "Reserve"—which status indicates that a TN has been reserved for a customer and is typically performed by a sales agent via the NRM GUI; 3) "Assign"—which status indicates that a TN has been assigned to a customer service order which assignment is typically performed by SRMS; 4) "Working"—which status indicates that the service order to which a number is assigned has been provisioned. This is performed by SRMS, when the number has been successfully provisioned in a switch; and 5) "Suspend"—which status indicates that a TN is reserved for a customer, but will not be activated for some time, usually a limited time period. Numbers may be kept reserved for a customer only for that limited time. This is typically performed by a sales agent via the NRM GUI; and, 6) "Disconnect"—which status indicates that the service to which a number was assigned has been disconnected. To perform a number disconnect, a sales agent enters a service disconnect order in SRMS. When the order is completed, SRMS sends a message to NRM to update the status of the associated number(s) from "working" to "disconnected". The update to a "Disconnect" status begins an aging process whereby a disconnected number must be kept in this status for a defined time period (e.g., 60 days), after which it is automatically updated by NRM 140 to a status of "open". The aging process thus allows a number that has been disconnected to be available to the customer for some time period, in case the customer comes back and wants to activate the number again.

As known, when a customer leaves a telecommunications carrier, they may "port", i.e., take some or all of their numbers with them. For numbers that originally belonged to the carrier, i.e., numbers that were not ported into the carrier with a customer, a "port" order is entered into SRMS. The SRMS then sends a message, e.g., via a COBRA distributed object interface, to NRM causing NRM to move these numbers to another database where they are effectively assigned a "ported" status. In accordance with federal regulations, if a customer is assigned a number that belongs to a carrier, then leaves the carrier and ports their number with them, that customer may continue using that number with another carrier, but the number still belongs to the first carrier. If the customer drops the number at any time, the number ports back to the original carrier. A Number Portability Administration Center ("NPAC") is a centralized body, having a database, that monitors the Local Number Portability issues. Particularly, it is an entity that is outside of MCI (the assignee of the instant invention) and provides a common communication medium between different telecommunications service companies regarding inter-company porting of telephone numbers.

Figure 2:
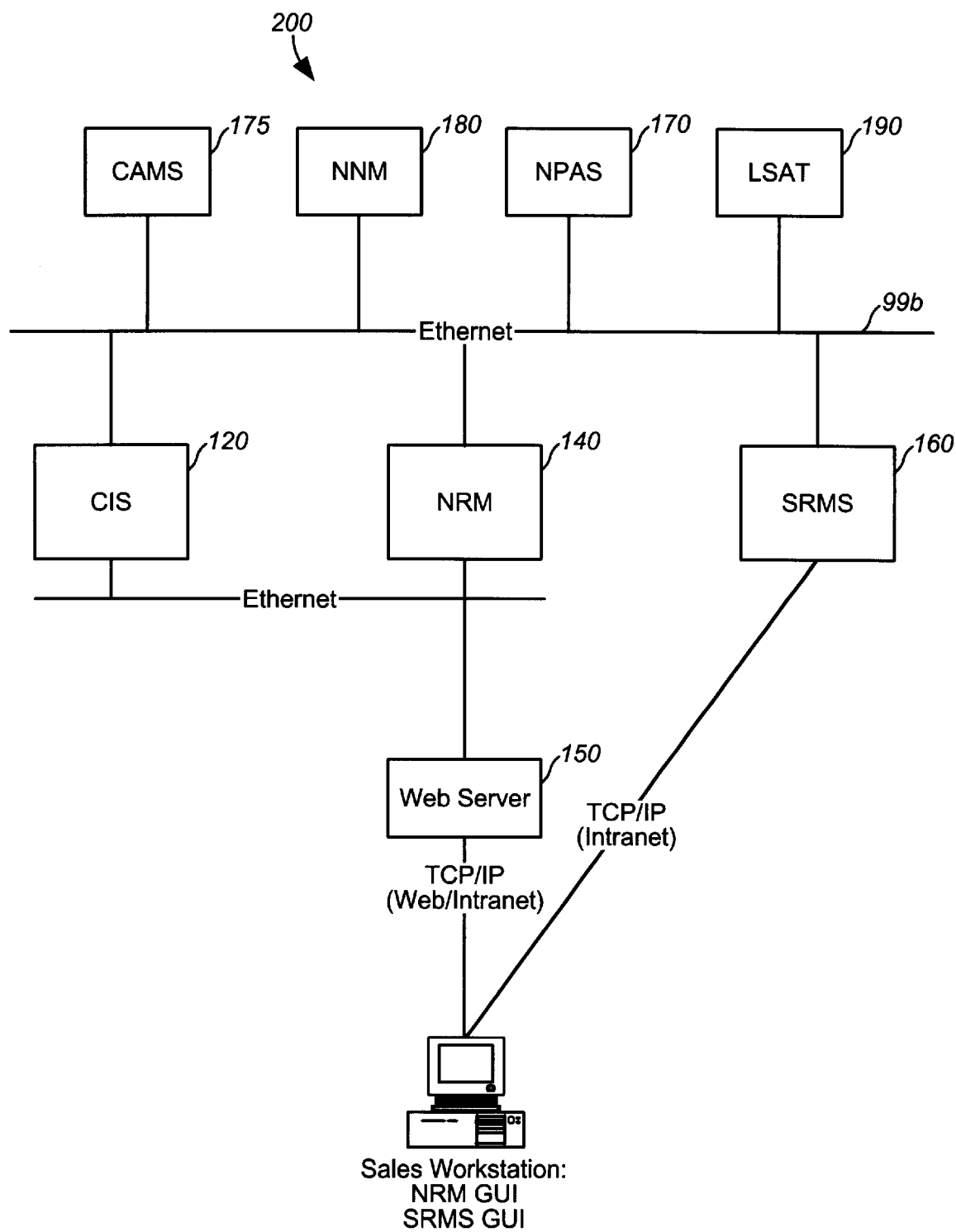
FIG. 2 illustrates a more comprehensive architecture for NRM system of the invention.

In addition to interfacing with the CIS and SRMS components, the NRM system 140 provides automated interfaces with other systems such as local service order entry and provisioning processes to provide an overall local number management system having enhanced functionality. FIG. 2 illustrates the NRM system architecture 200 having such enhanced functionality. In addition to the components identified by like numerals described with reference to FIG. 1, there is provided the following additional components: a Number Planning Administration System ("NPAS") component 170 which is primarily a proprietary database management system that maintains telephone numbering and geographical information, e.g., NPA-NXX, switch and rate center information provided by Local Exchange Routing Guide ("LERG") which is an outside body that is common to all local exchange carriers ("LEC"s) and represents a database within MCI's systems; a local billing system 175 hereinafter referred to as "CAMS" owned and operated by MCI; an NPA-NXX Management system ("NNM") component 180 which tracks the number provisioning process for new NPA-NXXS; and, a Local Service Activity Tracker ("LSAT") system 190 which is a workflow management system that assigns tasks and tracks service orders in service provisioning systems. As shown in FIG. 2, each of these components interface with NRM 140 over an Ethernet LAN 99a. These interfaces are typically messaging interfaces, though they may comprise remote database procedure calls, e.g., such as may be implemented with Oracle, as will be explained subsequently.

Figure 3A:
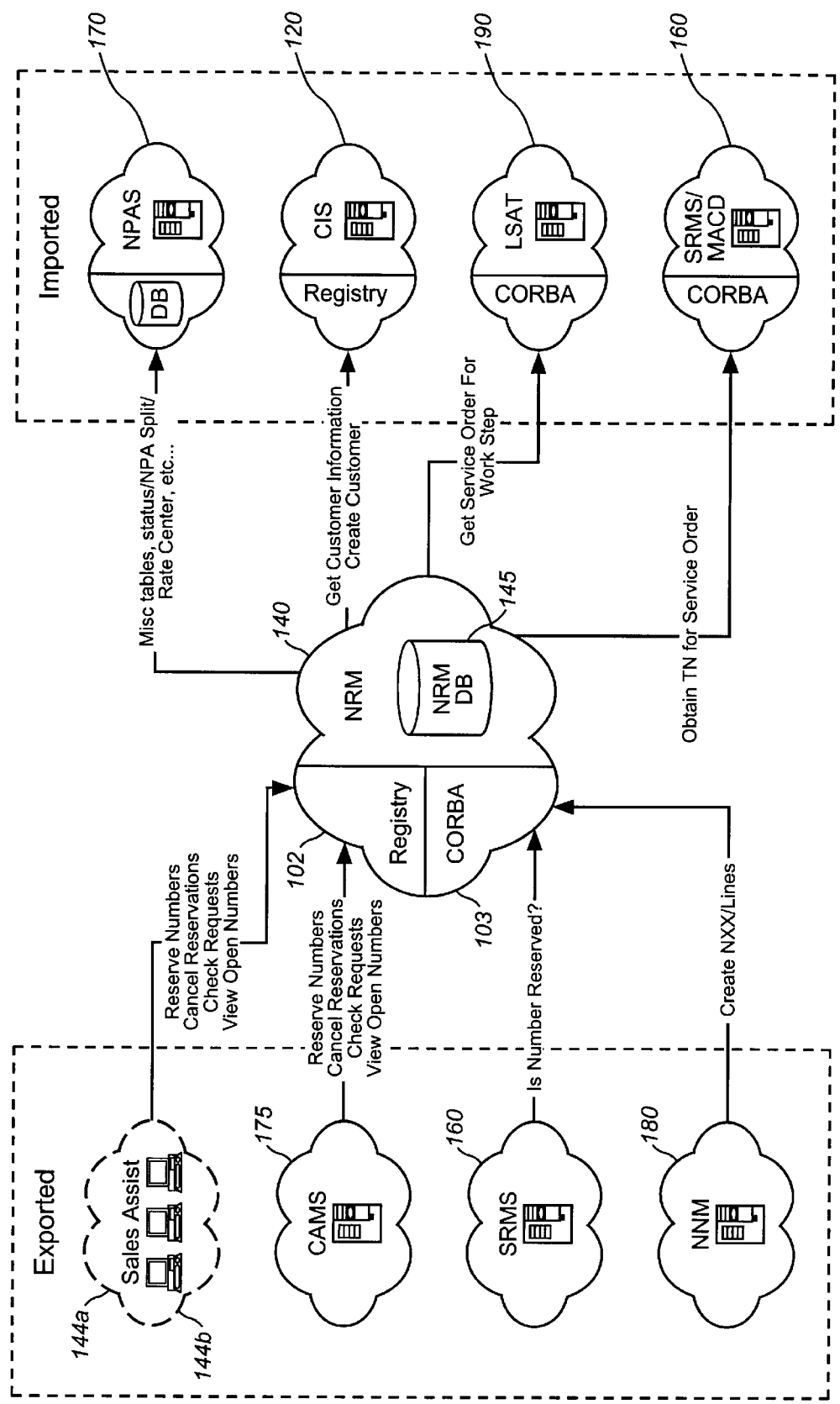
FIG. 3(a) illustrates the interface design diagram of the NRM system of the invention.

Particularly, as shown in the interface design diagram of FIG. 3(a), messaging interfaces include the use of an API messaging system 102, referred to herein as "Registry" and described in detail in commonly-owned, copending U.S. patent application Ser. No. 08/560,550, or, a Common Object Request Broker Architecture ("CORBA") 103 which is a non-proprietary industry standard for remote object interfacing in a distributed, object-oriented environment. A CORBA provides encapsulation of physical memory addressing within object identifiers. The NRM component 140 utilizes both Registry and CORBA in interfacing with external systems over an Ethernet LAN, or via TCP/IP if multiple networks are used. It should be understood that the Ethernet LAN in FIG. 2 connecting the Web Server to NRM and CIS to provide a Web interface, may be the same or different Ethernet LAN 99b that provides NRM with connectivity to back-end systems. It should be understood that data layer links other than Ethernet may also be used.

As shown in FIG. 3(a), the functional interfaces with the NRM system 140 include those systems acting as clients to the NRM server 140 and NRM database 145 including: CAMS 175, SRMS 160, NNM 180 and the sales workstation application embodying both the NRM GUI 144a and the SRMS GUI 144b, hereinafter referred to as "Sales Assist"; and, those systems acting as servers to NRM client processes including: NPAS 170, CIS 120, LSAT 190 and the SRMS 160.

With regard to the NPAS component 170, one function of NRM is to identify available numbers for a customer based on the customer's address, since numbers are currently associated with a geographical rate center. The NRM queries NPAS 170 to identify the rate center associated with a customer's address. The NRM can then identify within its own database 145 the available numbers associated with that rate center. Another function of NRM is to identify both the rate center and serving switch for a number that a customer is porting to the carrier from another carrier. The NRM queries NPAS rate center tables (not shown) to identify a rate center and all available switches for a number ported in. To select a switch to serve a customer's number (whether the number is ported from another carrier or is a new assignment), available switches for a rate center are identified with a query to NPAS; NRM then applies its own programmed business rules to select a switch, if more than one switch is available for the identified rate center.

NRM also queries NPAS to determine the state in which a number belongs. This is used to select the appropriate state rules table from the NRM database 145. The state rules tables include the business rules that NRM must apply in order to comply with state regulations.

NRM also requires NPAS for NPA splits and other number relief activities. Such activities, especially NPA splits, can effect telephone numbers and change them. An NRM batch job 147 (see FIG. 3(*b*)) is run to update the NRM database with any number relief activity. For example, for NPA splits, NRM queries NPAS to determine which NPA-NXXs are changing and when; an NRM batch job then makes these changes to the numbers in the NRM database at the appropriate time.

Figure 4:
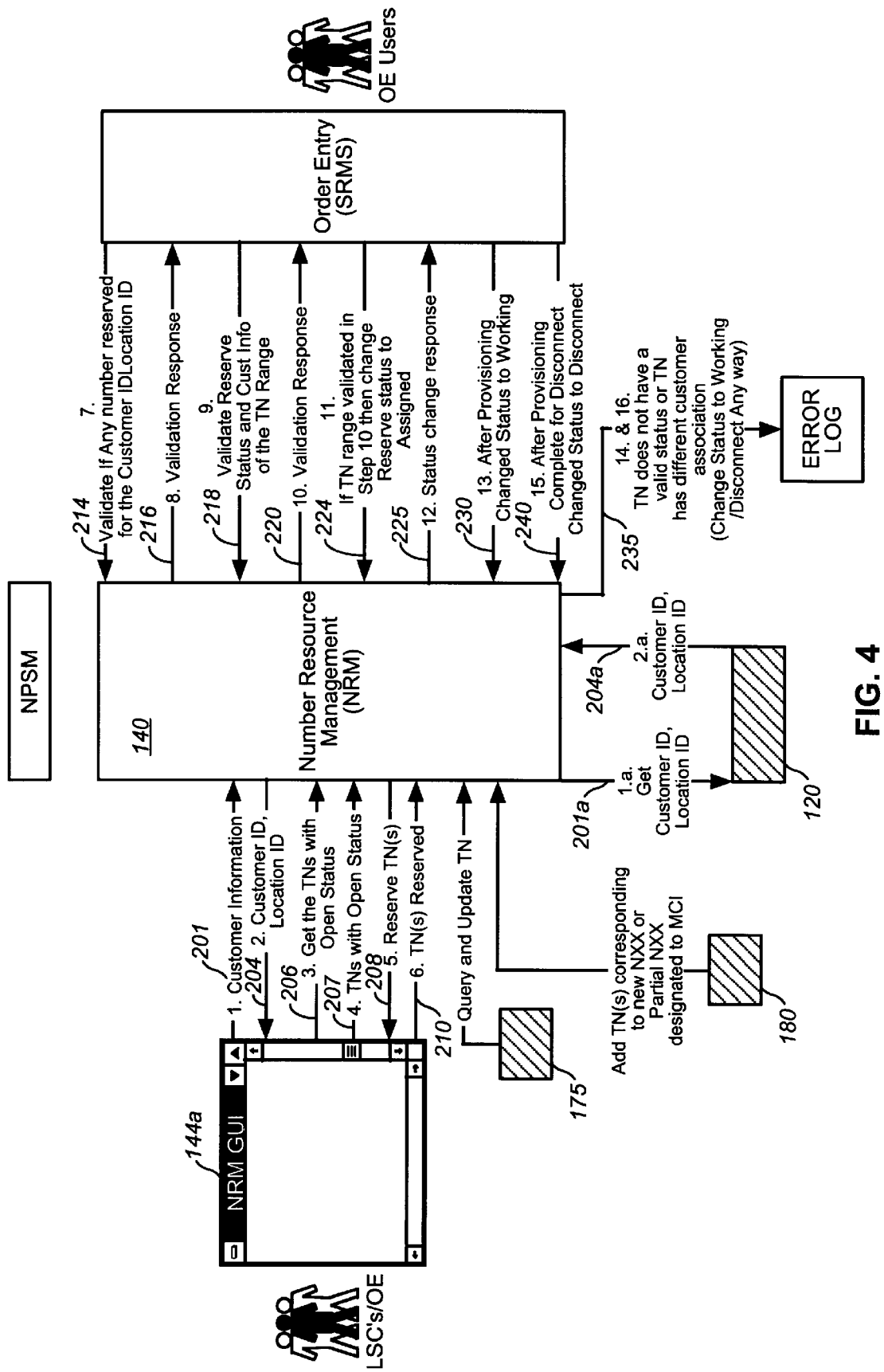
FIG. 4 depicts a high level diagram of the manual and automated processes involved in the implementation of the NRM system 140 of the invention.

FIG. 4 depicts a high level view of the automated processes involved in the implementation of the NRM system 140 of the invention. Users of the system include Local Sales Consultants ("LSC") and Order Entry ("O/E") staff who interface with the system through the web-based NRM GUI 144*a*, e.g., for reserving either MCI Facility TN(s) and ported TN(s). As shown in FIG. 4, in a first step, indicated at step 201, the user provides customer information such as the customer name and address to NRM server 140 to obtain the Customer ID and the Location ID. As before, the sales agent can enter a customer name and have NRM retrieve from CIS the customer/location entries that match. The NRM system interfaces with CIS 120 to obtain the corresponding Customer ID and Location ID information from CIS at step 201*a*. The CIS returns the Customer ID and Location ID information to NRM at step 204*a* which returns this information to the user as indicated at step 204. It should be understood that if the customer does not exist in the CIS system 120, the NRM GUI 144*a* provides a facility to enter the customer information in the CIS Database and obtain the Customer ID and Location ID. Then, at step 206, the user requests the list of TN(s) with "open" status in the database and the NRM returns the list of available TN(s) at step 207. With all the essential information available, the user submits the reservation request for the selected TN(s), as indicated at step 208. Upon receiving the request, the NRM 140 processes the request, by reserving the TN(s) (numbers), changing the status of the TN(s) from OPEN to RESERVED status, and returning an acknowledgment to the user as indicated at step 210.

In the preferred embodiment, there are two reservation options available: 1) reserving desired MCI Facility TN(s) for a Customer; and, 2) reserving any MCI Facility TN(s) for a customer in a specific NPA-NXX. In the case 1) of reserving desired MCI Facility TN(s), the LSC or O/E user enters the NPA/NXX and the desired TN range (start and end of the range) prior to submitting the reservation request. In the case 2) of reserving any MCI Facility TN(s) for a customer in a specific NPA-NXX, the LSC or O/E user enters the desired NPA/NXX and the number of lines to be reserved.

Figure 7:
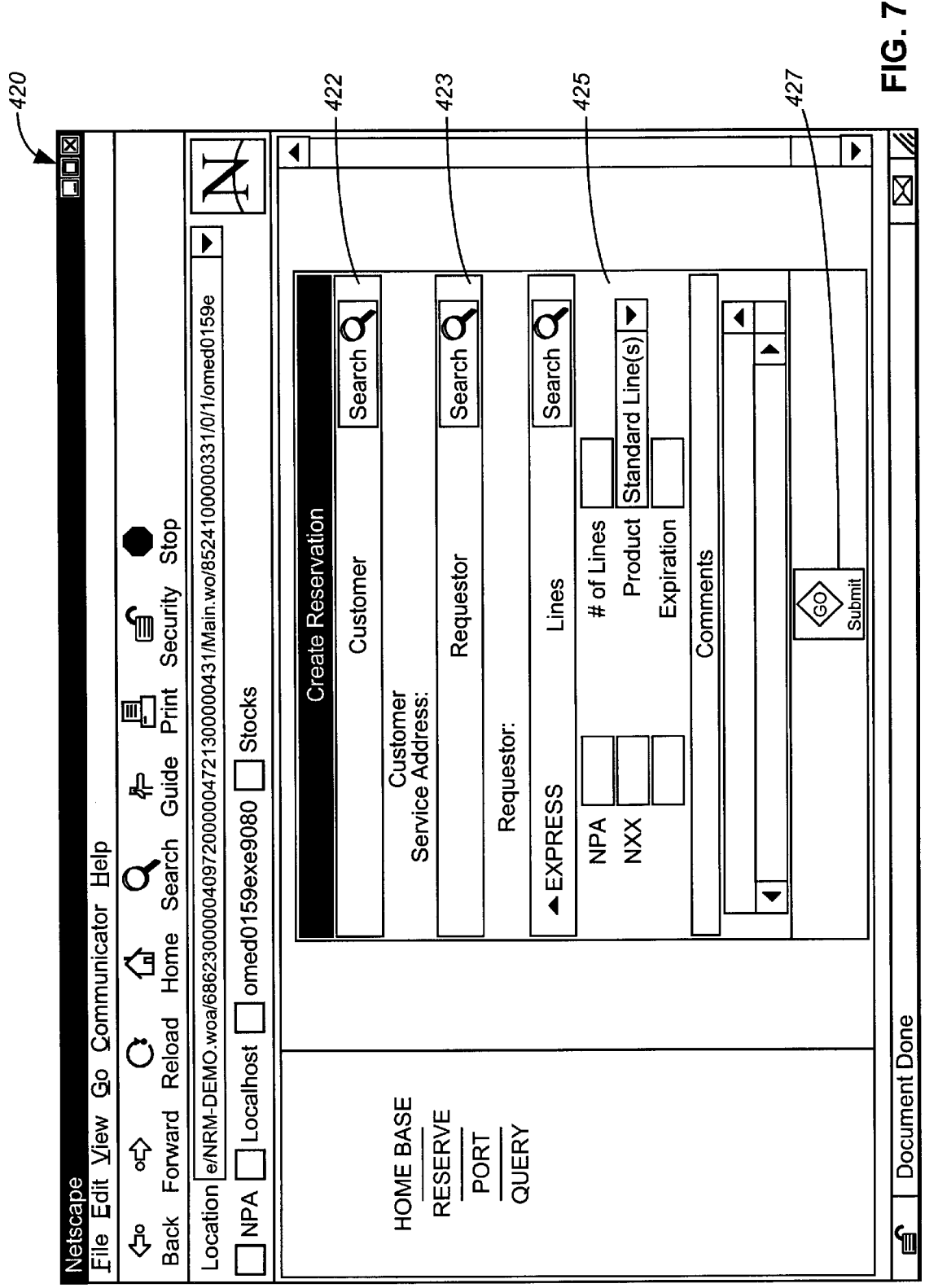
FIG. 7 illustrates an example NRM GUI display implemented for performing the TN(s) number reservation process.

FIG. 7 illustrates an example NRM GUI display implemented for performing the TN(s) number reservation process. After accessing an NRM Web site and logging in, an LSC can open a create reservation form. As shown in FIG. 7, this form 420 provides a field 422 prompting user inputs for customer information; a field 423 prompting input for user (requestor) information; fields 425 for entering the NPA-NXX and the number of lines to be reserved for the request; and, a button icon 427 for submitting the reservation request.

Once the reservation request is submitted, and before order provisioning, the NRM 140 performs a validation process. In the case 1) of reserving desired MCI Facility TN(s), validation includes checking the reservation request against state specific Public Utility Commission ("PUC") rules, e.g., checking whether the reservation request is for a state with mandated sequential numbering. For states that mandate sequential numbering, NRM 140 checks if the request fits into, e.g., a current block of 1,000 being used. If the PUC rules are not satisfied, i.e., reservation request does not fit into the current block of 1,000 numbers being used, the system logs a violation and generates a warning message. Either way, the process proceeds with validating the request against certain business rules. For example, a customer may only be able to reserve a certain amount of numbers, or, the number block must be reserved and allocated for each NXX in strategic way. If any business rules are violated, the system logs a violation and generates a warning message. The system may also determine whether the selected numbers are targeted for an NPA Split. If the selected TN(s) are targeted for NPA Split then a warning message is displayed to the user indicating the projected date for the NPA Split to happen. Once the rules have been applied and any warning message generated or violation logged, the NRM System fulfills the reservation request by changing the status of TN(s) from "OPEN" to "RESERVED" and, saving the following information corresponding to the TN(s) being reserved: i) Name/ID of the user making reservation; ii) Name and VNET number of the person requesting the reservation; iii) Customer ID/Location ID; iv) Comments; v) Date of Reservation , vi) # of Days the reservation is required for; etc.

In the case 2) of reserving any MCI Facility TN(s) for a customer in a specific NPA-NXX, after a reservation request is submitted, the NRM system validates the request against business rules and generates a warning message and/or logs a violation. Additionally, a validation of the request is made against state specific PUC rules. Thus, for example, if the request fits into the current block of 1,000 being used then the reservation is made. In case the reservation request does not fit into the current block of 1,000 numbers being used and the rate of utilization of the current block is less then the state mandated rate to move to next 1000 number block, the system logs a violation and reserves the numbers within the next available smallest block that can accommodate the requested numbers. Again, once the rules have been applied and any warning message generated or violation logged, the NRM System fulfills the reservation request by changing the status of TN(s) from "OPEN" to "RESERVED" and, saves the information corresponding to the TN(s) being reserved.

It should be understood that, in the preferred embodiment, after the TN(s) are reserved an aging process of reservation number kicks in. For example, the NRM system may provide, by default, 60 days of reservation period. However, this can change based upon the state mandated PUC rules or by customer request, as will be explained. The NRM system additionally checks for those TN(s) having a reservation period that has exceeded the default reservation period. If a reservation is found expired, the system automatically changes the status for that TN(s) to OPEN. Additionally, after the reservation has been made, the information regarding the reserved TN(s) can be up-loaded into different systems as the NRM system supports communication for reservation status. Host systems may then populate their respective databases.

Having reserved the TN(s) for the customer number, the next step of the process is for the LSC or O/E personnel to enter a service order to provision the reserved numbers through SRMS. In further view of FIG. 4, as indicated at step 214, at the beginning of this O/E process, the SRMS system 160 first validates if there is/are number(s) reservation(s) for the customer. Thus, before the O/E enters the service order, SRMS 160 automatically passes Customer ID and Location ID from the service order to the NRM 140. The NRM 140 then searches its database for the Customer ID and Location ID combination received from SRMS. If TN(s) are found under RESERVED status for the Customer ID and Location ID combination then, as indicated at step 216, the NRM returns a YES indication and the process continues. Otherwise, if TN(s) are not found under RESERVED status for the Customer ID and Location ID combination, the NRM returns a NO indication, i.e., the numbers are to be reserved first with the NRM 140. Similarly, as indicated at step 218, during the O/E process, the SRMS 160 validates if the particular TN(s) are reserved for the customer ID and Location ID combination. The NRM 140 again searches its database for the TN(s), Customer ID and Location ID combination and provides a validation response at step 220, indicating either the TN(s) reservation is valid, in which case the process continues, or, the TN(s) reservation is not valid, in which case the cause of the validation failure is investigated. For example, the TN(s) may be in the NRM database but do not have a "RESERVED" status, or, the TN(s) may have a "RESERVED" status but either or both the Customer ID and the Location ID are different from that indicated in the service order. In these examples, an error message is sent to SRMS from NRM. After validation, as indicated at step 224, before the Service Order is sent down stream for provisioning, SRMS 160 asks NRM 140 to move the status of the number from RESERVED to ASSIGNED.

In response to this notification, employing the same validation sequence between SRMS and NRM, NRM changes the status of the TN(s) in its database 145 from RESERVED to ASSIGNED. The NRM then sends a response back to the SRMS 160, as indicated at step 225. If the number status is changed successfully in NRM the TN(s) provisioning process is performed, otherwise the cause of the failure is investigated and an error message logged.

Having provisioned the TN(s), an order is submitted to the billing system. Prior to submitting this order, a notification is made to NRM 140 from SRMS to update the TN(s) status from ASSIGNED to WORKING. The NRM searches its database for the TN(s), if found with the valid status and proper customer association, the status of the number is changed to WORKING, as indicated at step 230. In the preferred embodiment, even if the TN(s) has a different status than ASSIGNED or, has a different customer associated with the TN(s), an error message is logged in the error log, but the status of the number is still changed to WORKING, as indicated at step 235. If the TN(s) are not found, then an error message is logged in the error log.

In case a customer discontinues service, the SRMS issues a disconnect service order for the TN(s) and the disconnect is provisioned in the switch. For non-ported numbers, SRMS notifies NRM to change the status of the TN(s) to DISCONNECT. Particularly, NRM 140 searches its database for the TN(s), Customer ID and Location ID combination received with the notification. If the TN(s) is not found in the database, then an error message is logged. As indicated at step 235, even if the number has a different status than "WORKING" or has a different customer associated with the TN(s), an error is logged and the status of the number is changed to DISCONNECTED anyway. If the TN(s) has a "WORKING" status, the status of the TN(s) is changed to "DISCONNECTED", as indicated at step 240, FIG. 4.

In the preferred embodiment, after a TN(s) status is changed to "DISCONNECTED", an aging process is initiated. Aging is the process of making a disconnected telephone number unavailable for re-assignment to another subscriber for a specified period of time. An aging interval includes any specific announcement treatment period, as well as the blank telephone number intercept period. A number is disconnected when it is no longer used to route calls to equipment owned or leased by the disconnecting subscriber of record. The aging process provides the aging intervals that are to be implemented before the disconnected TN(s) is again available for sale. After the rules based upon the aging process are implemented, the status of the TN(s) is changed back to "OPEN".

Figure 5:
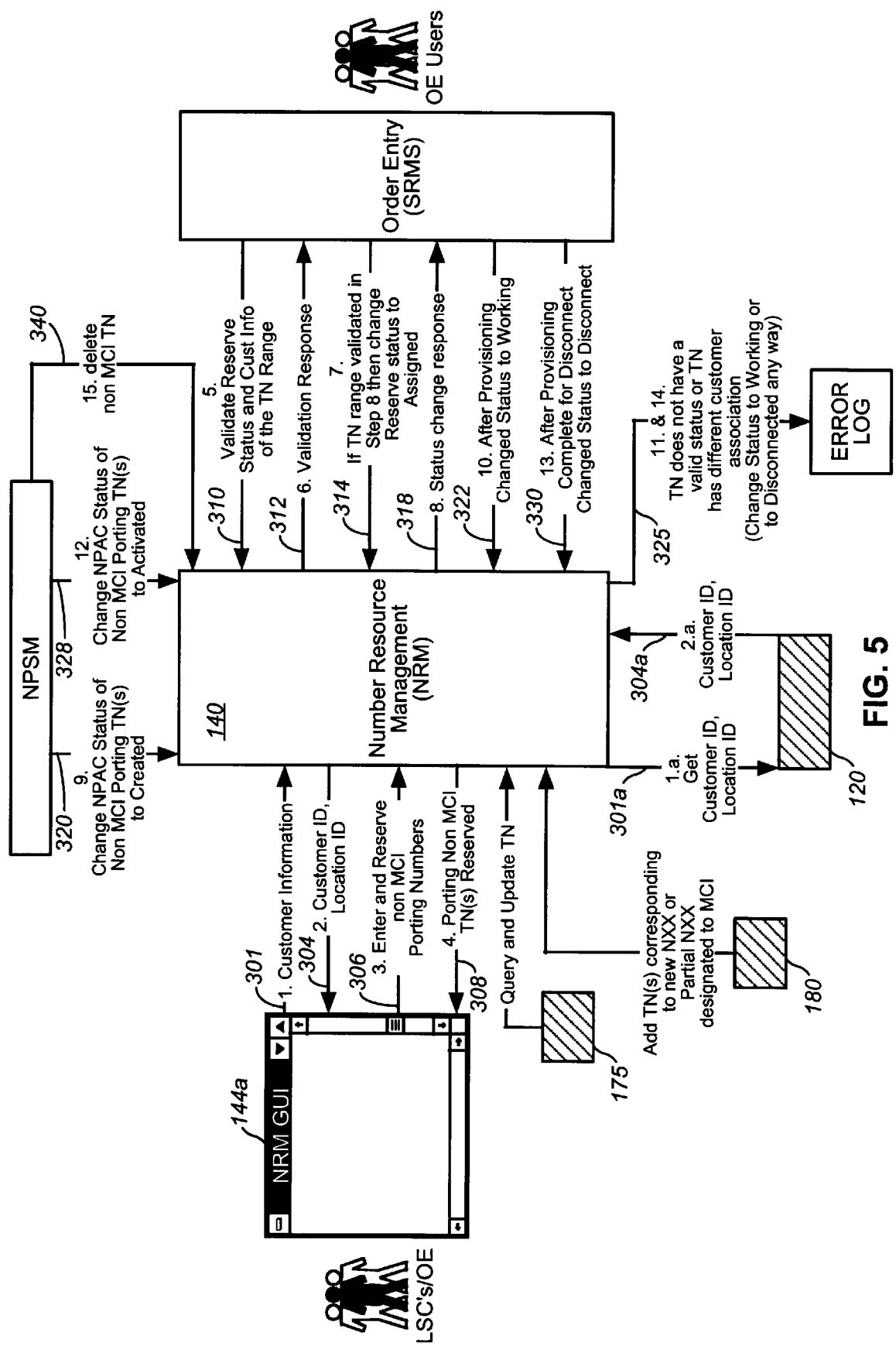
FIG. 5 depicts a high level diagram illustrating the steps for reserving ported numbers according to the invention.

FIG. 5 depicts a high level view of the automatic process implemented in the NRM system 140 for performing local number portability ("LNP") functions, i.e., reserving and processing ported (e.g., non-MCI-owned) TN(s) for customers. As shown in FIG. 5, in a first step, indicated at step 301, the user provides customer information such as the customer name and address to NRM server 140 to obtain the Customer ID and the Location ID. The NRM system interfaces with CIS 120 to obtain the corresponding Customer ID and Location ID information from CIS at step 301a. The CIS returns the Customer ID and Location ID information to NRM at step 304a which returns this information to the user as indicated at step 304. If the customer does not exist in the CIS system 120, the NRM GUI provides a facility to enter the customer information in the CIS database and obtain the Customer ID and Location ID. With all the essential information available, the user submits the reservation request for the porting TN(s), as indicated at step 306. Upon receiving the request, the NRM 140 performs a validation process to verify whether the NXX is portable or not. If the process is not portable the process stops. If the requested number(s) are portable, the NRM system 140 fulfills the reservation request at step 308 by: saving the porting TN range in the NRM database 145; placing the status of TN(s) to "RESERVED"; and, saving the following information corresponding to the porting TN(s) being reserved: i) Name/ID of the user; ii) customer ID/location ID; and iii) comments.

Figure 8:
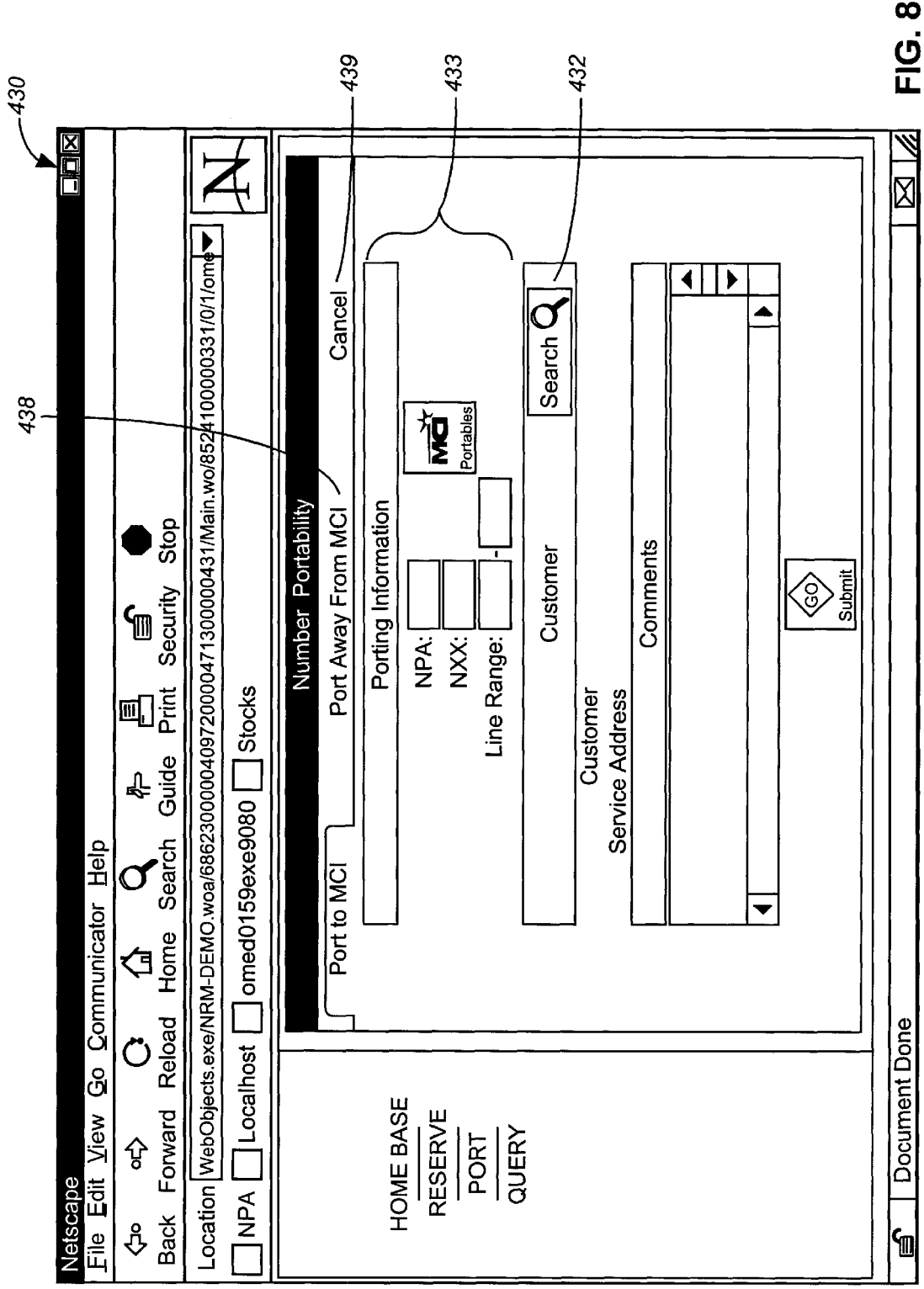
FIG. 8 illustrates an example NRM GUI display implemented for porting TN(s) numbers to the service provider.

FIG. 8 illustrates an example NRM GUI display 430 implemented for porting TN(s) numbers to the service provider, e.g., MCI, for a customer. As shown in FIG. 8, there is provided a field 432 prompting user input for customer information; a field 433 prompting input of the porting information including NPA-NXX and the number of lines to be ported, and, a button icon 437 for submitting the porting request. From the example web-page shown in FIG. 8, the user is provided with an option 438 for presenting a web-page enabling the porting of TN(s) for a NPA-NXX away from the service provider, and, an option 439 for presenting a web-page enabling the cancellation of porting TN(s) for a NPA-NXX.

Referring back to FIG. 5, as indicated at step 310, the SRMS validates if the particular TN(s) are reserved for the customer ID and Location ID combination. After searching its database, the NRM 140 responds to the validation request at step 312 as follows: if there are any number reservations for the Customer ID and Location ID, then the process continues; otherwise, the numbers are to be reserved first with the NRM 140. Next, as indicated at step 314, the SRMS 160 validates if the particular TN(s) are reserved for the customer ID and Location ID combination. The NRM 140 again searches its database for the TN(s), Customer ID and Location ID combination and provides a validation response indicating either the TN(s) reservation is Valid, in which case the process moves forward, or the TN(s) reservation is not valid, in which case the cause of the validation failure is investigated and an error logged. Before the Service Order is sent down stream for provisioning, SRMS 160 asks NRM 140 to move the status of the number from RESERVED to ASSIGNED. The NRM 140 then changes the status of the number in response to this notification and a response to the request is sent back to the SRMS 160, as indicated at step 318. If the number status is changed successfully in NRM the process moves forward, otherwise the cause of the failure is investigated and an error logged.

In the preferred embodiment, as indicated at step 320, the Number Portability Subscription Manager ("NPSM") notifies the NRM 140 to update the NPAC status field for the ported TN(s) to "CREATED". After the number(s) are provisioned in the switch the SRMS notifies NRM to change the status of the number to "WORKING" as indicated at step 322. The NRM searches its database for the TN(s), and if found with the valid status and proper customer association, the status of the number is changed to "WORKING". If the number has a different status then "ASSIGNED" or has a different customer associated with the TN(s), the error is logged and the status of the number is changed to "WORKING" anyway, as indicated at step 325. Then, as indicated at step 328, after the ported TN(s) are provisioned, the NPSM notifies the NRM to update the NPAC status field to "ACTIVATED".

In the instance when the SRMS issues a disconnect service order for a ported TN(s) and the disconnect is provisioned in the switch, SRMS notifies NRM to change the status of the TN(s) to "DISCONNECT" at step 330, FIG. 5. If the number has a different status then "WORKING" or has a different customer associated with the TN(s), the error is logged and the status of the number is changed to "DISCONNECTED" anyway as indicated at step 325. The NPSM then queries NRM to validate the "DISCONNECTED" status of the TN(s). Upon validation of the disconnected status, it contacts NPAC for confirmation. After NPAC confirms the disconnection, the NPSM system notifies NRM 140 to delete the non-MCI TN(s), as indicated at step 340. The NRM, upon receiving the request from NPSM, deletes the non MCI TN from the NRM database.

With further regard to the LNP function provided by the NRM system 140, an NRM customer can port its MCI TN(s) to another carrier. As it is an MCI TN(s) it thus remains in NRM database with a "porting indicator" having a value as "PORTED OUT". Particularly, the user chooses the "Port Away" option from the LNP-NRM GUI 144*b,* which presents a dialog box prompting the user to enter the NPA/NXX and the TN(s) ranges to be ported out. The user makes a request to port out TN(s). The NRM system 140 verifies, if the NXX is portable or not. If not portable then the process stops at this step, otherwise, the NRM System 140 fulfills the Port Out request by changing the porting indicator to "PORTED OUT". After the Porting out indicator is changed, confirmation is sent to the user.

When a customer returns to MCI with its MCI TN(s), the porting indicator is changed to a status depicting the number is not ported anymore. The user enters the TN range associated with the customer returning to MCI. The NRM checks if it is MCI's TN or not. If the number being ported in is an MCI TN(s) then the NRM process disconnects the Port Out process before NPSM can coordinate with NPAC for porting the customer back to MCI. Then, the TN(s) is placed back in "RESERVED" status. Otherwise, the user can make the request to reserve the non-MCI porting TN(s) in the manner as described in view of FIG. 5 to place the number back in "RESERVED" status.

In the high-level flow diagram depicted in FIG. 5 regarding the processing of ported TN(s), the NPSM updates the NPAC status field corresponding to the NPSM and NPAC interaction. In this scenario, (e.g., at steps 320 and 328), the NPSM first passes the non-MCI TN(s) and the status to which the NPAC status of the TN(s) in NRM has to be moved. The NRM searches its database for the TN(s) received and then updates the NPAC status field of the TN(s) with the status received from NPSM.

Via the Web-browser GUI, number resource management functionality provided by the NRM system 200 enables users to perform the following number tracking and status query operations: 1) tracking numbers with "RESERVED" Status; 2) tracking numbers with "WORKING" Status; 3) tracking MCI TN(s) ported out to other carriers; 4) tracking MCI TN(s) Assigned to Customers; 5) tracking MCI TN(s) in suspended status; 6) tracking Non-MCI numbers (Ported TN(s)) with "RESERVED" Status; 7) tracking non-MCI numbers (Ported TN(s)) with "WORKING" Status; 8) tracking non-MCI numbers (Ported TN(s)) assigned to customers; 9) tracking non-MCI numbers (Ported TN(s)) in suspended status; 10) tracking numbers with "OPEN" Status; 11) suggesting smallest number of block availability for NPA-NXX; and, 12) querying on TN(s) for associated information.

Figure 9:
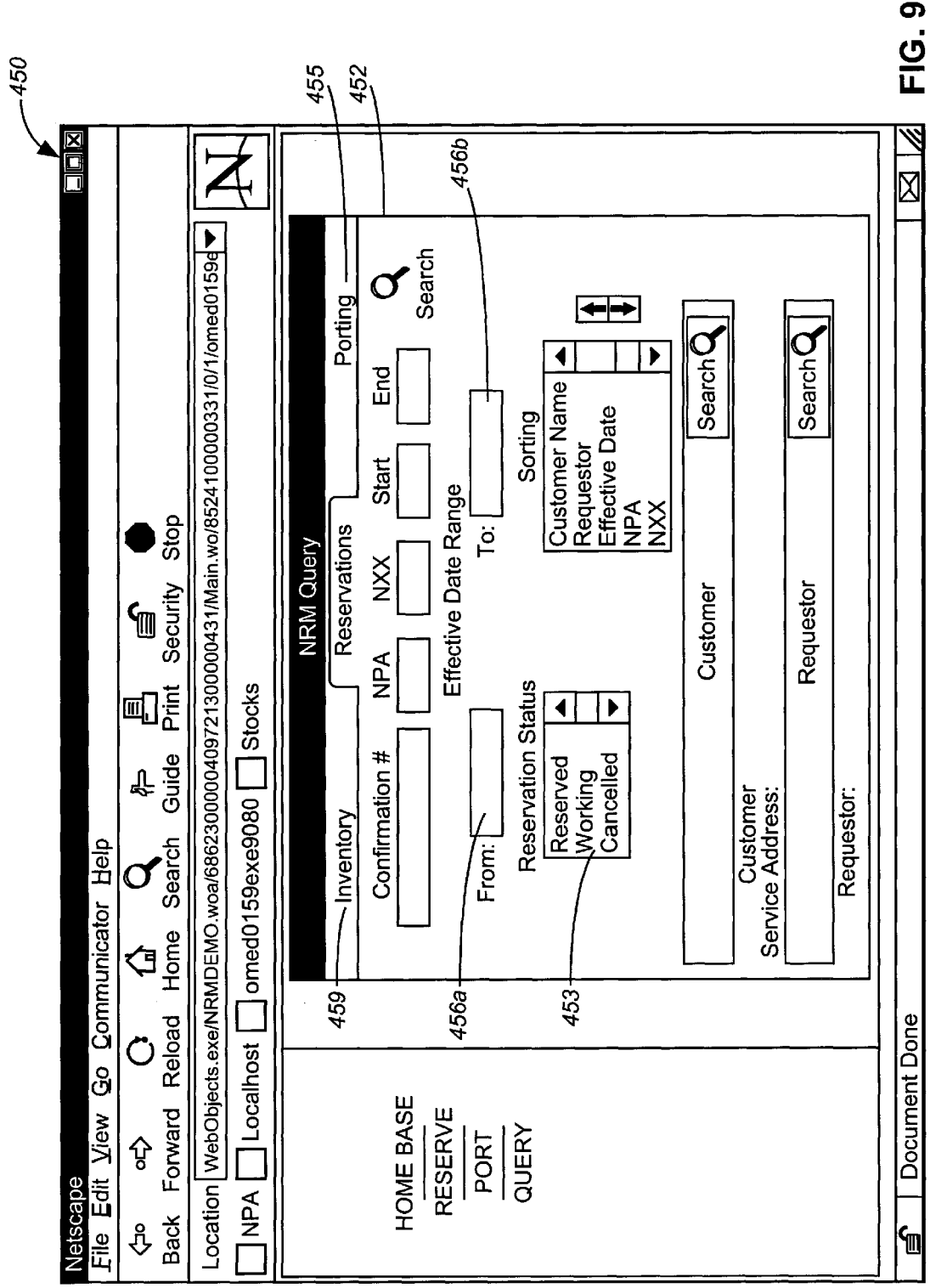
FIG. 9 illustrates an example NRM GUI display implemented to perform NRM number reservation queries.

In each of these queries, an LSC or O/E user enters the NPA, NPA-NXX, or the line ranges in an NPA-NXX, or a customer Name. A time/date range search can also be performed. If a customer Name is entered then NRM system 140 interfaces with the CIS to obtain the customer ID. For the case 1) of tracking numbers with "RESERVED" Status, the NRM system provides a list of MCI TN(s) in reserved status for a given NPA, NPA-NXX, line range, or a customer Name. Specifically, in the example web-page 450 shown in FIG. 9, the NRM user enters the NPA, NPA-NXX, the line ranges or a customer in the NRM "Reservations query" dialog box 452, and selects reservation status in menu 453. In response to the query command, NRM 140 searches its database for TN(s) belonging to the NPA or NPA-NXX or customer ID and having "RESERVED" status and then displays the TN(s) detail. Using this query, for example, a user may implement cancellation of reserved TN(s) for a customer. Particularly, the user submits this query to the NRM database, and can select the TN(s) desired to be canceled. The user then submits the request for cancellation and the system changes the status of those TN(s) from "RESERVED" to "OPEN". As another example, a customer may desire to extend a reservation period for a TN(s). After selection of the TN(s) for which the extension in reservation is to be made, the NRM GUI provides the complete record of the TN(s) and the user updates the reservation period field 456*a,b,* as shown in FIG. 8.

For the case 2) of tracking numbers with "WORKING" status, NRM system provides a list of TN(s) in working status for a given NPA, NPA-NXX, line range, or customer name. Particularly, in response to the entered NPA, NPA-NXX, the line ranges in an NPA-NXX, or a customer Name, NRM searches the database for TN(s) belonging to the information provided in step 1 and 2 and has "WORKING" status and displays the details.

For the case 3) of tracking TN(s) ported out to other carriers, the NRM system provides a list of MCI TN(s) that are ported out to other carriers for a given NPX, NPA-NXX, line range, or a customer Name. Particularly, in response to the entered NPA, NPA-NXX, the line ranges in an NPA-NXX, or a customer Name, NRM searches the database for TN(s) having a porting indicator indicating "Ported out" and displays the results.

For the case 4) of tracking TN(s) that are assigned to customers, the NRM system provides list of MCI TN(s) that are assigned to customers for a given NPX, NPA-NXX, line range, or a customer Name. Particularly, in response to the entered NPA or NPA-NXX or the line ranges in an NPA-NXX or a customer Name, NRM searches the database for TN(s) having an "ASSIGNED" status and displays the details.

For the case 5) of tracking TN(s) that are in a suspended status, the NRM system provides list of MCI TN(s) that are in a suspended status to customers for a given NPX, NPA-NXX, line range, or a customer Name. Particularly, in response to the entered NPA, NPA-NXX, the line ranges in an NPA-NXX, or a customer Name, NRM searches the database for TN(s) having a "SUSPENDED" status and displays the details.

Figure 10:
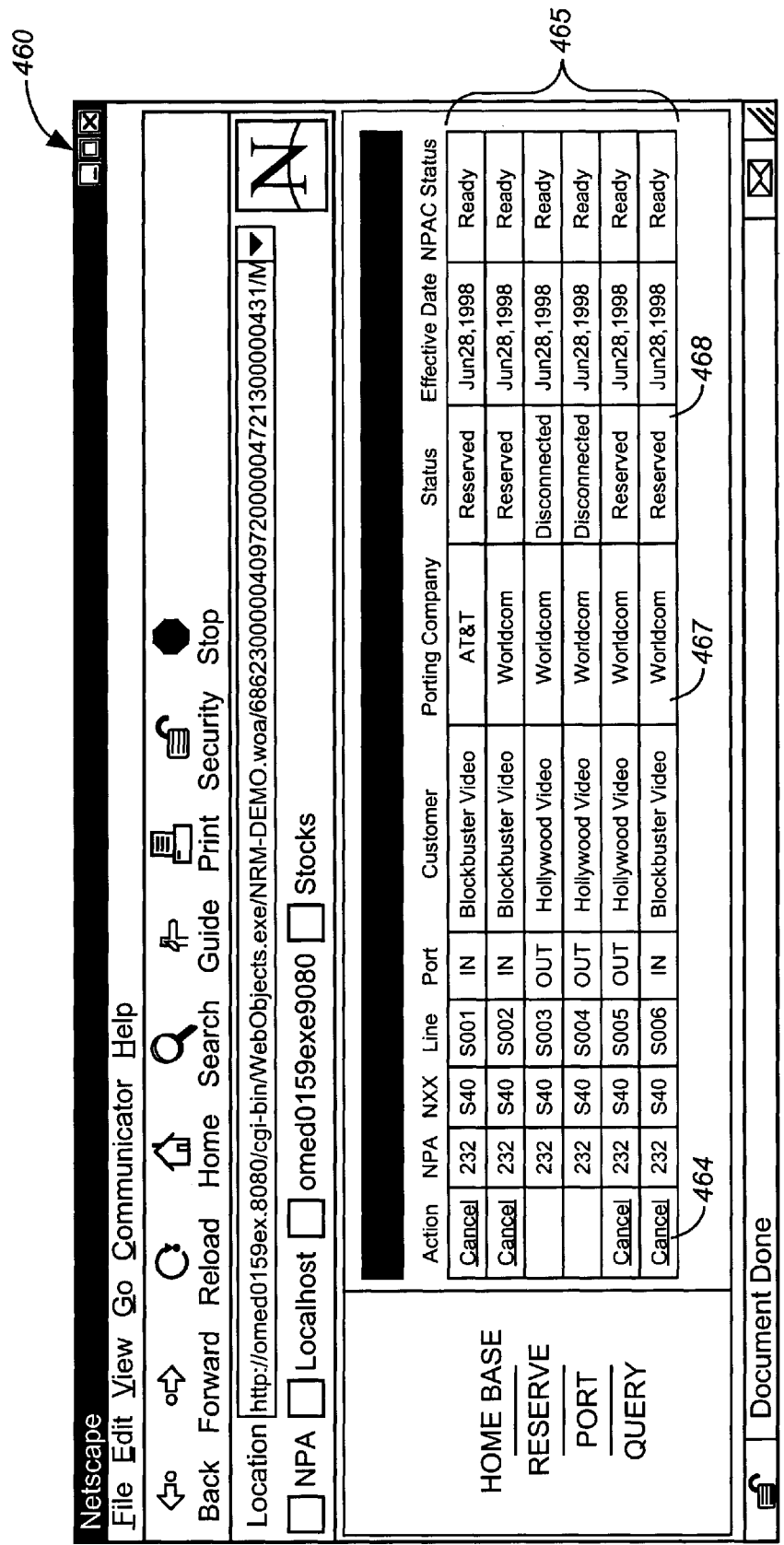
FIG. 10 illustrates an example NRM GUI display showing the results of a query for a customer's ported numbers.

For the case 6) of tracking Ported TN(s) with a "RESERVED" status, the NRM system provides list of MCI TN(s) that are in a reserved status to customers for a given NPX, NPA-NXX, line range, or a customer Name. Particularly, in response to the entered NPA, NPA-NXX, the line ranges in an NPA-NXX, or a customer Name, NRM searches the database for those TN(s) having a "RESERVED" status and porting indicator indicating "Ported In" status and will display the details such as the porting status and porting company. Thus, from the example web-browser screen 450 shown in FIG. 9, a user is provided with the option 455 to select the NRM query screen for bringing up ported numbers associated with the customer for the desired NPA-NXX. FIG. 10 shows an example web-page display 460 showing the results 465 of a query for a customer's ported numbers including a column 467 indicating the porting number company for the TN(s), i.e., NPA-NXX-line, and, a column 468 indicating the porting numbers status. In column 464, FIG. 10, a user may initiate an action to cancel selected reserved ported TN(s), for example. It should be understood that a customer desiring to cancel reservation of a ported reserved number, can implement a query from this web-page initiating NRM functionality relating to ported numbers. Such a screen enables a user to select the desired reserved ported TN(s) to be canceled and submit a cancellation request. If the porting process has not yet been initiated on the TN(s), then the selected ported TN(s) are deleted from the NRM database. In case the NPSM has started the porting process on the TN(s), NPSM first cancels the processes associated with the TN(s) and requests the NRM to delete the porting TN(s) from the NRM database.

For the case 7) of tracking Ported TN(s) with a "WORKING" status, the NRM system provides a list of MCI TN(s) that are in a working status to customers for a given NPX, NPA-NXX, line range, or a customer Name. Particularly, in response to the entered NPA, NPA-NXX, the line ranges in an NPA-NXX, or a customer Name, NRM searches the database for those TN(s) having a "WORKING" status and porting indicator indicating "Ported In" status and will display the details.

For the case 8) of tracking Ported TN(s) with an "ASSIGNED" status, the NRM system provides a list of MCI TN(s) that are in an assigned status to customers for a given NPX, NPA-NXX, line range, or a customer Name. Particularly, in response to the entered NPA, NPA-NXX, the line ranges in an NPA-NXX, or a customer Name, NRM searches the database for those TN(s) having a "ASSIGNED" status and porting indicator indicating "Ported In" status and will display the details.

For the case 9) of tracking Ported TN(s) with a "SUSPENDED" status, the NRM system provides list of MCI TN(s) that are in a suspended status to customers for a given NPX, NPA-NXX, line range, or a customer Name. Particularly, in response to the entered NPA, NPA-NXX, the line ranges in an NPA-NXX, or a customer Name, NRM searches the database for those TN(s) having a "SUSPENDED" status and porting indicator indicating "Ported In" status and will display the details.

For the case 10) of tracking TN(s) that are OPEN, the NRM system provides a list of MCI TN(s) that are in an "OPEN" status to customers for a given NPX, NPA-NXX, line range, or a customer Name. Particularly, in response to the entered NPA, NPA-NXX, the line ranges in an NPA-NXX, or a customer Name, NRM searches the database for TN(s) having an "OPEN" status and will display the details.

For the case 11) the user is enabled query the NRM system to determine the smallest block of TN(s) capable of satisfying a reservation request. In this scenario, the NRM user enters the NPA-NXX and the # of lines (count). The NRM searches the database and displays the smallest block available, which fits the requested number of TN(s).

Figure 11:
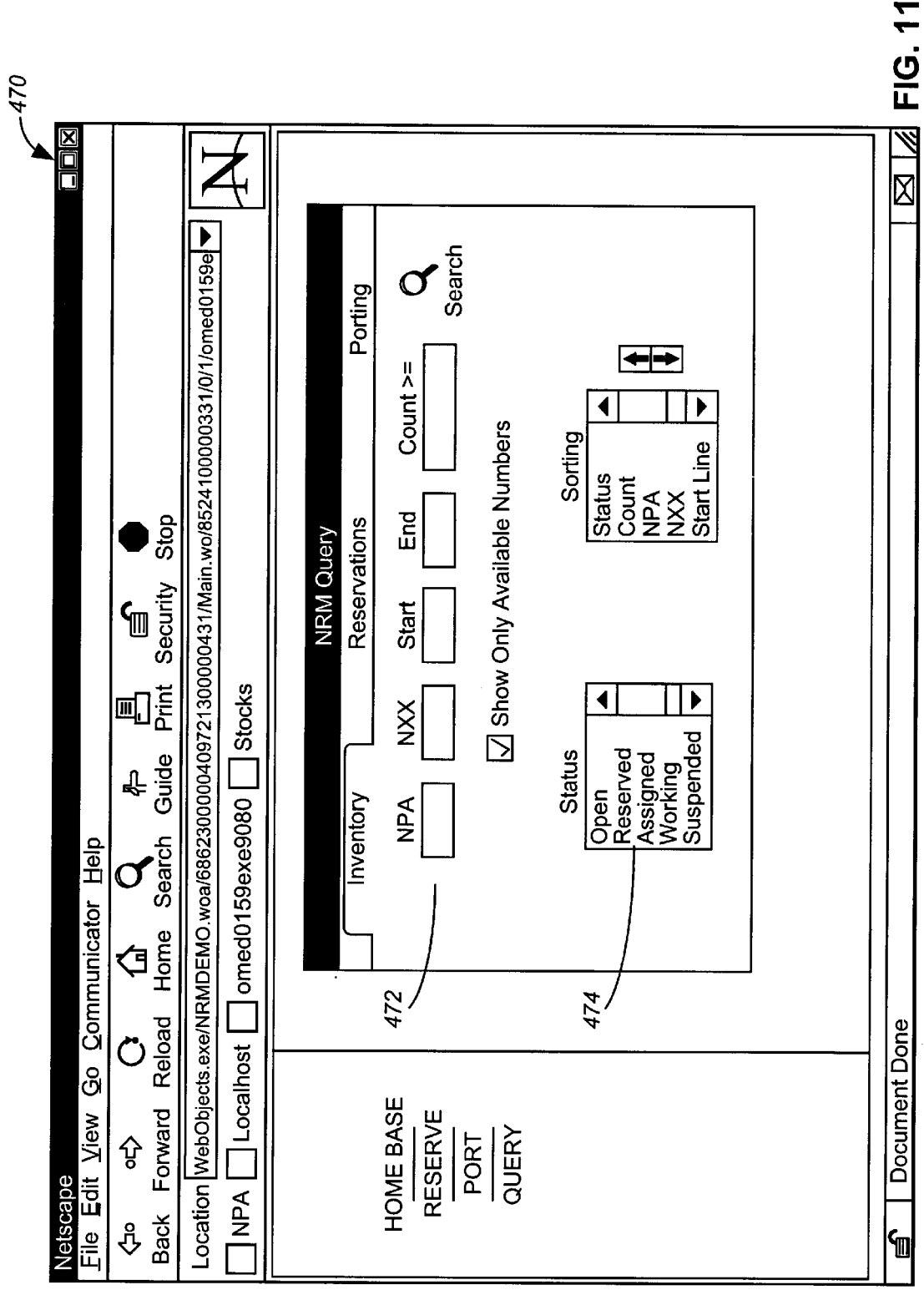
FIG. 11 illustrates an example NRM GUI display implemented to perform NRM inventory queries.

For the case 12), in the preferred embodiment, the NRM system provides the user with the general ability to obtain all information regarding any TN(s), regardless of what status the number is in. Thus, from the example web-browser screen 450 shown in FIG. 9, a user is provided with the option 459 to select the NRM inventory query screen for generating a web-page such as shown in FIG. 11. FIG. 11 shows an example web-page display 470 having a entry field 472 enabling user input of a range of lines for a particular NPA-NXX and, an entry field 474 for entering a desired status for the numbers to be tracked. The query results (not shown) provides the user information such as the status of TN, customer name (if assigned, working or reserved for a customer), the name and VNET (identification) of the person who reserved the number.

The NRM software architecture implementing the NRM system functionality is broken into two main concepts: 1) components which comprise executable program such as servers, applications, batches, etc.; and, 2) frameworks which are re-usable software libraries comprising objects and object classes broken on functional boundaries and including all of NRM business logic. By abstracting all common functions and behavior into a small set of frameworks/classes, high levels of code re-use is achieved.

Figure 3B:
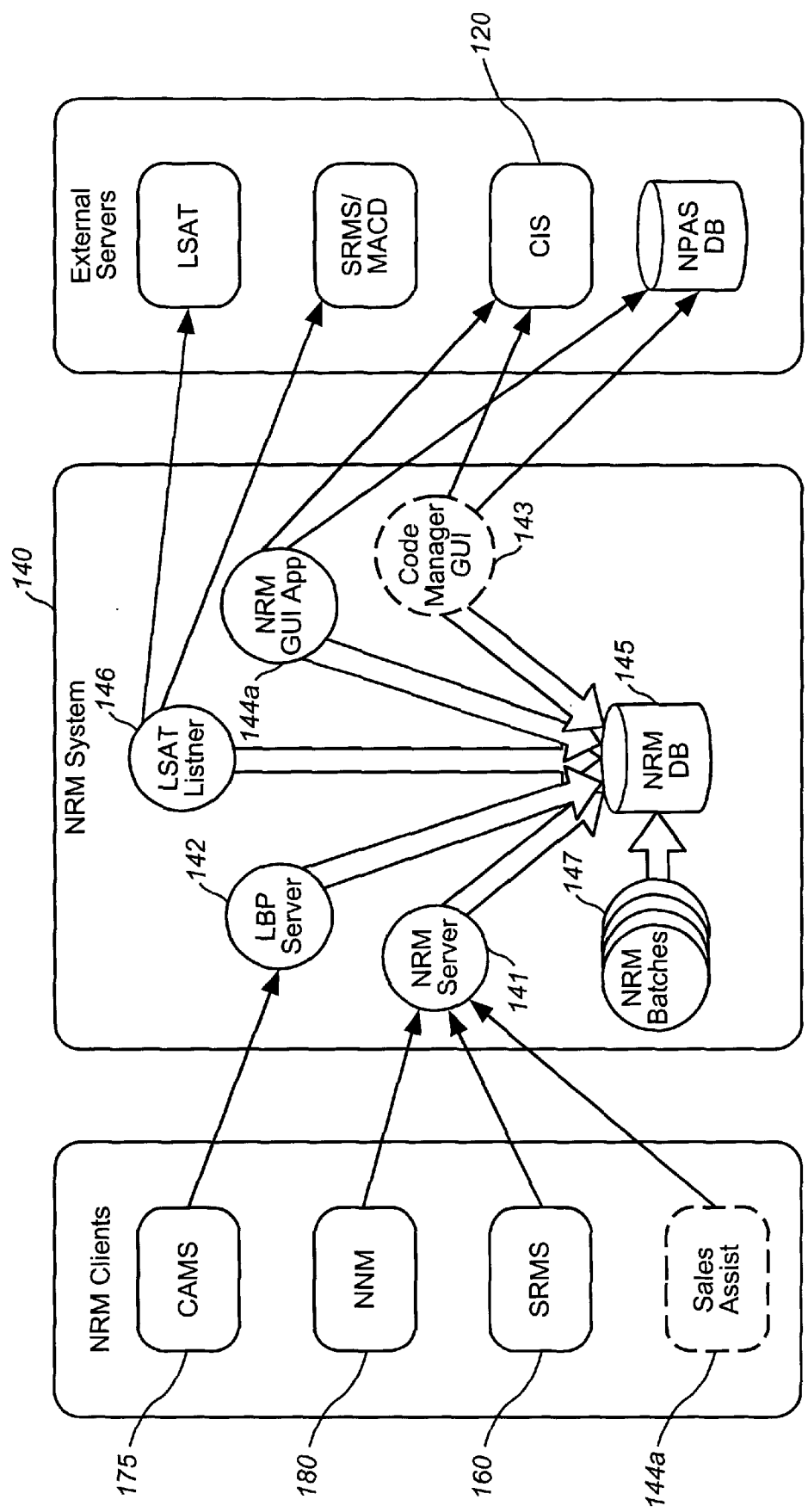
FIG. 3(b) illustrates the software component diagram for the NRM system of the invention.
Figure 3C:
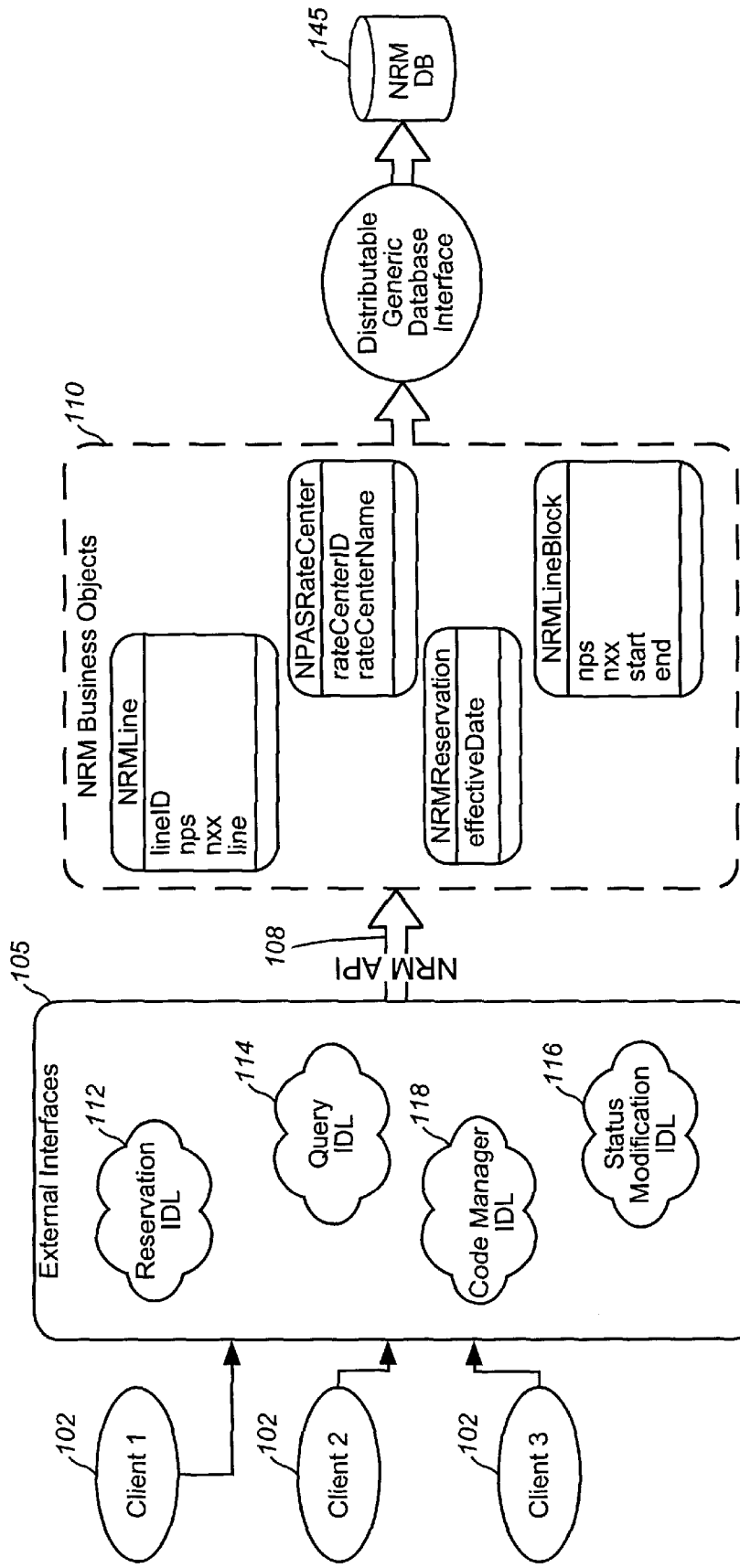
FIG. 3(c) illustrates the software architecture diagram for the NRM system of the invention.

The Software Architecture Diagram illustrated in FIG. 3(c) shows clients or external users 102 of the NRM system interacting with the NRM database 145 via external interfaces 105 implemented as Registry or CORBA which are systems providing distributed services. These systems provide an application programming interface 108 to the NRM frameworks, depicted in FIG. 3(c) as NRM business objects 110 enabling NRM functionality. In the manner described herein, the Registry and CORBA systems provide such interfaces enabling TN(s) reservation 112, TN(s) queries 114, TN(s) status modification 116, and Code manager functions 118.

As shown in FIGS. 3(a) and 3(b), the NRM component architecture defines the different software "processes" comprising the NRM system 140. Thus, as shown in FIG. 3(b), the NRM server process 141 handles requests from clients that deal with number maintenance. For example, to verify TN status and change TN status, the SRMS 160 client system communicates with the NRM server 141 via CORBA messaging, as does the NNM client 180. The NRM GUI 144a communicates with the CIS system 120 via Registry messaging to get the Customer and Address IDs. The Sales Assist agents, for example, implement Web objects (FIG. 3(c)) via the web server (FIG. 2) to reserve TNs via the NRM GUI. Specifically, the NRM GUI 144a is the human interface for creating reservations, porting numbers, and querying the NRM database. The NRM comprises a web interface that allows user access to NRM from a Web Browser with attendant advantages such as: thin clients; true multi-tiered architecture allowing for future scalability; and short development time. The NRM GUI 144a is designed using Web Objects comprising a cgi-bin driver for communicating with Web Object applications included in the NRM.

Additionally provided is a code manager GUI 143 which is available to support analytical, reporting, and report distribution functions and represents both a GUI and a process. Code Manager processes data in the NRM Database 145 to apply various business rules. Business rules are applied by NRM to comply with federal and state government mandated regulations, as well as to implement non-regulatory business procedures as specified by the carrier. For example, some rules dictate how long a number can be reserved, and how long a disconnected number must age before becoming available for a new assignment, etc. While some business rules are applied by a Code Manager, other rules may be applied via: the NRM GUI (e.g. by showing only certain numbers as available for assignment); by NRM Batches (batch jobs that run periodically to perform NRM Database updates; and, even in the implementation of the NRM Database, i.e., in the way in which the tables are defined. For example, many state-mandated rules are included within tables (one table for each state); the appropriate table is referenced by NRM based on the geographical location of the NPA-NXX. The Code Manager also provides an override function for business rules. Thus, a system administrator or other specially authorized user uses the Code Manager GUI to override any business rules. For example, one business rule that is non-regulatory but may be specified, is that numbers may be reserved in blocks (sequential numbers) of less than 50. The NRM GUI applies this by only allowing a sales agent to reserve 49 or less sequential numbers for a customer. The Code Manager GUI can be used to approve orders for a predetermined amount, e.g., 50 or more, of sequential numbers. Another example of a non-regulatory business rule that may be applied by the way in which the NRM Database tables are designed is the assignment of a number to a carrier's switch when more than one switch is available to serve a rate center. Once a number is associated with a rate center (via NPAS), it must be provisioned to one switch. When more than one switch is possible, number assignment can be via one of several methods including: geographical split—the serving area is divided geographically, and numbers for locations in each area are assigned to a specific switch; geographical overlay—numbers within an entire service area are divided among the multiple switches in a load balancing scheme; and, service type or class—numbers for a specific type or class of service are assigned to a specific switch.

Additionally, reporting functions supported by code manager include: monitor NPA-NXX status distribution in NRM by providing NPA-NXX usage summaries; and, monitor line reservations including, e.g., those TN(s) currently in the aging cycle, those about to immediately expire, and reservation periods that have been extended, etc.

Additionally provided is an LSAT listener component 146 for querying LSAT for notifications of status changes for local service orders. When a status change is detected, it retrieves the order number from LSAT, queries SRMS with that order number to retrieve the local telephone numbers associated with that order, and updates the status for those numbers in the NRM Database.

The NRM Batches 147 are batch jobs that perform periodic updates to the NRM Database. These are used, for example, to update the NRM Database for NPA splits, or to categorize numbers for new service types, or to synchronize the NRM database in response to a database audit.

The CAMS/LBP system 175 interfaces the NRM system via Registry client—server messaging at an LBP server process 142 in order to handle all requests from CAMS to add data to the NRM database 145 via a store procedure.

Referring back to FIG. 3(a), in the case of exported interfaces, i.e., where the NRM system 140 functions as a server, interfaces with NPAS 170 are carried out using stored procedures, e.g., stored in (NPAS) Oracle environment and called by NRM from an (LBP) Oracle environment. These stored procedures function to: 1) Retrieve the information associated with a working telephone number; 2) Retrieve the ported telephone numbers for a given working telephone number; 3) Insert or update the information of a working telephone number; 4) Delete a working telephone number; 5) Insert or update the information of a ported telephone number; 6) Delete a ported telephone number; 7) Insert or update the information of a resale telephone number; and 8) Delete a resale telephone number. It should be understood that the Oracle stored procedures can be replaced with API messaging such as "Registry" messages, i.e., the LBP can send Registry messages to NPAS and then receive responses back.

As the SRMS system 160 validates and verifies a number before processing service for the customer, it gives the customerid, locationid and other numbers associated with the customer before processing a service request for the customer numbers. The NRM verifies whether the numbers are assigned to the same customer or different customer. If any numbers SRMS passes to NRM are not assigned to the same customer, the NRM will pass the correct numbers for that customer id and location id. If the customerid and locationid are not in NRM, then SRMS throws an exception indicating the customer is not available.

In the case of exported interfaces, i.e., where the NRM 140 functions as a client, interfaces with NPAS are via direct database connections, or messaging. The following NPAS tables are accessed by the NRM: 1) STATE_TABLE which is a table with abbreviations of the States (e.g., AL—Alabama, CT—Connecticut etc.); and, 2) RATE_ CENTER which is a table that holds the rate center information. A Rate Center is a definition of a geographic area within a boundary that has common characteristics in terms of locality, and telecommunications properties. A rate center can contain many NPA-NXXs. These tables may be accessed to cross reference the information available in other tables and provide a consolidated presentation both in the reports and for display to the users of the GUI.

With further regard to the Registry messaging described in co-pending U.S. patent application Ser. No. 08/560,550, a simple conversational dialog includes a single request message passed from a client to a server, and then a single reply message returned from the server to client in response. Preferably, as shown in FIG. 3(b), a messaging format is used by both the LBP NRM Registry Client (CAMS) and NPAS NRM Registry Server 142 for sending and receiving messages. To further illustrate how data is passed between the two system, APIs, e.g., written in C, are implemented for a SendRequest and SendReply Registry verbs: The SendRequest REGISTRY is loaded with the character string SENDREQUEST. The SendReply REGISTRY is loaded with the character string SENDREPLY. As described, the LBP standard message format comprises a heading section and a data section. The purpose of the header is to provide message sizing parameters, give context to the data section, provide application instance data storage and storage for message completion codes with respect to the business program processing. The LBP standard message header section is defined below in Table 1. All data fields in the header section are text ASCII values.

TABLE 1

| Field | Description | Length |
|---|---|---|
| Header Length | Size of the Header Section in bytes | 6 |
| Data Length | Size of the Data Section in bytes | 6 |
| Header Version | Version number of the header; Allows for supporting multiple header formats | 4 |
| Service Process Name | Contains the name of the Service Process (executable program) which will receive the message | 32 |
| Application Instance Data | Storage for application (client side) use. Data in this field makes the round trip from the client and back again; useful while processing asynchronous messages | 32 |
| Response Code | High level completion code. Identifies success and error completion codes for the originating system | 8 |
| Reason Code | Specifies the actual error code returned | 8 |

The corresponding data section for the request/response includes the data, which may be passed to or returned from the service processes.

The header and data sections of the client—server Registry messaging, including the data values associated for each of eight requests/responses enumerated above will now be described. In all 8) cases, the LBP-NRM Registry Client header sections is as a fixed length, e.g., 96 bytes, and the data length is calculated based on the actual size of the data section. As shown in Table 1 the header contains a process name which includes reference to a service process name indicating the executable program that will provide the requested service. For the case 1) of retrieving the information associated with a Working Telephone Number (WTN), the Header Version, Application Instance Data and Reason Code fields are left as blanks for this interface.

Once the NPAS/NRM Register Server receives the message from the client, it checks the "server process name" field to determine which server process to invoke. The server process then executes the stored procedure listed in a "Stored Procedure Name" field of the data section (not shown). After executing the stored procedure, the server process creates a response message comprising header and data sections with the data section comprising the response data for the specific request, e.g., information relating to working telephone numbers. This response message is passed back to the client. Provided in the response header section is a "Response Code" field indicating whether the processing completed successfully or not.

As described herein, the SRMS 160 is an order entry system through which service orders are entered for provisioning telephone Numbers (TNs) in, e.g., MCI's switch. Orders exist for both the MCI facility based as well as numbers Porting from other LECs. In the preferred embodiment, the SRMS server uses the services of CORBA compliant Oak Named Server (ONS) and database server since it queries the database tables residing in the Oracle database NRM. The interface provides transparency to the users of SRMS in the sense that users do not have to invoke another program to effect the Number status verification as well as the status update. In view of FIG. 3(a), the interface services handled by CORBA include: 1) SRMS queries to NRM for any TN reserved for the customer, i.e., performing a NRM database query with In Parameters, i.e., CustId, LocID, to check for any reserved TNs. The Out Parameters may include an error message if there is any process error; 2) SRMS verifies reservation for customer, i.e., performing a NRM database query the database with the In Parameters (CustId, LocId, TnStart, TnEnd) and check if the TN block is in "RESERVED" status. If true then return TRUE. If any one TN fails to be in "RESERVED" status then return FALSE and also identify the failed TNs in the Out Parameters. The Out Parms may be filled in only when there are error conditions, otherwise, the Out Parameters include no data; 3) SRMS verifies working TNs for customer, i.e., query the database with the In Parms and check if the TN block is in "WORKING" status. If true then return TRUE. If any one TN fails to be in "WORKING" status then return FALSE and also identify the failed TNs in the Out Parms; 4) SRMS changes TN status to ASSIGNED for customer, i.e., query the database with the In Parms and check if the TN block is in "RESERVED" status. If true and if the status change is a valid status move then change the status to "ASSIGNED" and return TRUE. If any one TN fails to be in "RESERVED" status or, the status move is an invalid status move, then FALSE is returned and the failed TNs identified in the Out Parms; 5) SRMS changes Customer ID/Location ID for Outside Move, i.e., query the NRM database with the In Parms of OldCustId and OldLocId and check if the TN block is in "WORKING" status. If all TN records found are in appropriate status then swap the OldCustId to NewCustId and OldLocId to NewLocId. If the change is valid and the change effected then return TRUE. If any one TN fails to qualify for the change, then return FALSE and also identify the failed TNs in the Out Parms; 6) SRMS changes TN status to WORKING for customer, i.e., query the database with the In Parms and check if the TN block is in "ASSIGNED" status. If true and if the status change is a valid status move then change the status to "WORKING" and return TRUE. If any one TN fails to be in "ASSIGNED" status or, the status move is an invalid status move, then change the Status to WORKING and then return FALSE and also return error message in the Out Parms. 7) SRMS changes PortedTN status to DISCONNECTED for customer; 8) SRMS changes TN status to PREVIOUS for customer.

The foregoing merely illustrates the principles of the present invention. Those skilled in the art will be able to devise various modifications, which although not explicitly described or shown herein, embody the principles of the invention and are thus within its spirit and scope.

What is claimed is:

1. A system for automatically managing number resources associated with a service provider, said service provider applying workflow procedures relating to one or more number resources for use by a customer of said service provider, said system comprising:

means for providing a customer identifier corresponding to said customer having number resources to be managed;

memory storage means having a repository of number resources associated with a customer identifier, each number resource having an associated status indicator;

means for updating the status indicator of a number resource in said memory storage means for a customer according to an implemented workflow procedure, wherein a workflow procedure includes reserving one or more number resources for a customer and provisioning one or more network switches to enable customer use of one or more number resources, said updating means updating said status indicator from a first status to a reserved status;

interface means enabling input of user directives relating to number resource management for a customer;

means responsive to said user directives for automatically accessing one or more number resources and their corresponding status indicators from said memory storage means, said interface means displaying said one or more number resources and their corresponding status indicators for said user; and means for validating a status indicator against said customer identifier for each said one or more number resources prior to said provisioning procedure.

2. The system as claimed in claim 1, wherein each said number resource has a first default status indicator before applying a workflow procedure.

3. The system as claimed in claim 1, wherein said validation means includes verifying that said number resources to be provisioned have a reserved status.

4. The system as claimed in claim 3, wherein prior to provisioning said network switches, said updating means updates said status indicator for said number resources from reserved status to assigned status.

5. The system as claimed in claim 4, whereby after provisioning said network switches, said updating means updates said status indicator for said number resources from assigned status to working status.

6. The system as claimed in claim 5, whereby a workflow procedure includes discontinuing use of one or more said number resources, said updating means updating said status indicator for said number resources from working status to discontinued status.

7. The system as claimed in claim 6, further including means for automatically applying business rules to said number resources when implementing said workflow procedures.

8. The system as claimed in claim 7, wherein a business rule includes placing said one or more number resources in said reserved status for a predetermined amount of time, said updating means automatically reverting said status indicator for each said number resources back to said first status when said predetermined amount of time expires.

9. The system as claimed in claim 7, wherein a business rule includes implementing an aging process for said one or more number resources in said discontinued status, said status indicator for each said aging one or more number resources being maintained at said discontinued status for a predetermined time interval.

10. The system as claimed in claim 5, whereby a workflow procedure includes suspending one or more number resources having a working status, said updating means updating said status indicator for said number resources from said working status to a suspended status.

11. The system as claimed in claim 1, wherein said service provider is a first telecommunications service provider, said system including means for reserving number resources associated with a second telecommunications provider for a customer, said memory storage means including a porting status indicator for each number resource of said second telecommunications provider.

12. The system as claimed in claim 11, wherein said porting status indicator for each number resource of said second telecommunications provider indicates porting in status, a workflow procedure including reserving one or more number resources having said ported in status, said updating means updating said status indicator to indicate a reserved status for said ported in numbers.

13. The system as claimed in claim 12, wherein said first telecommunications service provider releases one or more number resources associated with said first telecommunications service provider to a customer retaining services of a second telecommunications service provider, said updating means updating a status of said porting indicator for each said released one or more number resources to a porting out status.

14. The system as claimed in claim 12, wherein a customer ports one or more number resources associated with said first telecommunications service provider from a first predetermined geographic location to a second geographic location, said updating means updating a status of said porting indicator for each said one or more number resources to a porting out status.

15. The system as claimed in claim 1, wherein a user directive includes a request for accessing those number resources having a specified status indicator.

16. The system as claimed in claim 1, wherein a user directive includes a request for accessing those number resources having a specified porting status indicator.

17. The system as claimed in claim 1, wherein a user directive includes a request for changing a status of a number resource.

18. The system as claimed in claim 1, wherein said interface means includes a web/Internet browser, said user enabled to access said number resources from a remote computer terminal via a world wide web connection.

19. A method for automatically managing number resources associated with a service provider, said service provider applying workflow procedures relating to one or more number resources for use by a customer of said service provider, said method comprising:

providing a customer identifier corresponding to said customer having number resources to be managed;

storing one or more number resources associated with a customer identifier, each number resource having one or more associated status attributes;

updating a status attribute of a stored number resource for a customer according to an implemented workflow procedure wherein a workflow procedure includes reserving one or more number resources for a customer and provisioning one or more network switchers to enable customer use of corresponding one or more number resources, said method including updating a status attribute from said first status to a reserved status;

automatically accessing those stored number resources and associated status attributes for display at a user display terminal in response to a user directive; and validating a status indicator for each said one or more number resources against said customer identifier prior to applying said provisioning procedure.

20. The method as claimed in claim 19, further providing a default first status for number resources before applying a workflow procedure.

21. The method as claimed in claim 20, wherein said validating step includes verifying that said number resources to be provisioned has a reserved status.

22. The method as claimed in claim 21, wherein prior to provisioning said network switches, the step of updating said status attributes for said corresponding number resources from reserved status to assigned status.

23. The method as claimed in claim 22, whereby after provisioning said network switches, the step of updating said status attributes for said corresponding number resources from assigned status to working status.

24. The method as claimed in claim 23, whereby a workflow procedure includes discontinuing use of one or more said number resources, said method including updating said status attributes for said number resources from working status to discontinued status.

25. The method as claimed in claim 24, further including the step of automatically applying business rules said number resources when implementing workflow procedures.

26. The method as claimed in claim 25, wherein a business rule includes placing said one or more number resources in said reserved status for a predetermined amount of time, said method including automatically reverting said status attributes for each of said number resources back to said first status when said predetermined amount of time expires.

27. The method as claimed in claim 25, wherein a business rule includes implementing an aging process for said one or more number resources in said discontinued status, said method including maintaining said status attributes at said discontinued status for a predetermined time interval for each said one or more number resources being aged.

28. The method as claimed in claim 23, whereby a workflow procedure includes suspending one or more number resources having a working status, said method including updating said status indicator for said number resources from said working status to a suspended status.

29. The method as claimed in claim 19, wherein said service provider is a first telecommunications service provider, said method including reserving number resources associated with a second telecommunications provider for a customer, said method including the step of updating status attributes to indicate a porting in status for each number resource of said second telecommunications provider reserved.

30. The method as claimed in claim 29, wherein a workflow procedure includes reserving one or more number resources having said ported in status, the method further including updating said status attributes to indicate a reserved status for said ported in numbers.

31. The method as claimed in claim 30, wherein said first telecommunications service provider releases one or more number resources associated with said first telecommunications service provider to a customer retaining services of a second telecommunications service provider, the method including the step of updating a status attribute to indicate a porting out status for each said released one or more number resources.

32. The method as claimed in claim 30, wherein a customer ports one or more number resources associated with said first telecommunications service provider from a first predetermined geographic location to a second geographic location, said method further including updating a status attribute to indicate of said porting indicator for each said one or more number resources to a porting out status.

33. The method as claimed in claim 19, wherein a user directive includes a request for accessing those number resources having a specified status attribute.

34. The method as claimed in claim 19, wherein a user directive includes a request for changing a status attribute of a number resource.

35. The method as claimed in claim 19, including implementing a web/Internet based browser enabling access to said stored number resources from a remote computer terminal via a world wide web connection.

* * * * *